United States Patent
Schultes

(10) Patent No.: US 9,975,106 B2
(45) Date of Patent: May 22, 2018

(54) PACKING ELEMENT FOR MASS-TRANSFER AND/OR HEAT-EXCHANGE COLUMNS OR TOWERS

(71) Applicant: Raschig GmbH, Ludwigshafen (DE)

(72) Inventor: Michael Schultes, Ludwigshafen (DE)

(73) Assignee: RASCHIG GMBH, Ludwigshafen (DE)

( * ) Notice: Subject to any disclaimer, the term of this patent is extended or adjusted under 35 U.S.C. 154(b) by 131 days.

(21) Appl. No.: 15/130,753

(22) Filed: Apr. 15, 2016

(65) Prior Publication Data

US 2016/0228848 A1  Aug. 11, 2016

Related U.S. Application Data

(63) Continuation of application No. PCT/EP2014/002904, filed on Oct. 29, 2014.

(30) Foreign Application Priority Data

Oct. 30, 2013 (DE) .......................... 10 2013 009 576
Oct. 30, 2013 (DE) .......................... 10 2013 018 190

(51) Int. Cl.
 B01J 19/30 (2006.01)
(52) U.S. Cl.
 CPC ...... B01J 19/30 (2013.01); *B01J 2219/30284* (2013.01); *B01J 2219/30296* (2013.01)
(58) Field of Classification Search
 CPC .............. B01J 19/30; B01J 2219/30284; B01J 2219/30296

USPC ...................................... 261/95, 99, DIG. 72
See application file for complete search history.

(56) References Cited

U.S. PATENT DOCUMENTS

| | | | | |
|---|---|---|---|---|
| 4,041,113 A | * | 8/1977 | McKeown | B01D 47/14 210/150 |
| 4,303,599 A | * | 12/1981 | Strigle, Jr. | B01J 19/30 261/98 |
| 4,575,435 A | * | 3/1986 | Kuhl | B01J 19/30 261/94 |

(Continued)

FOREIGN PATENT DOCUMENTS

| | | |
|---|---|---|
| EP | 0 764 462 B1 | 3/1997 |
| EP | 3 764 762 A1 | 3/1997 |

(Continued)

*Primary Examiner* — Charles Bushey
(74) *Attorney, Agent, or Firm* — Hackler Daghighian Martino & Novak

(57) ABSTRACT

A packing element, for use in mass and/or heat transfer columns or towers through which a gas and/or liquid flows, includes at least one first group of strips having a plurality of exchange surfaces formed by the surfaces of half-wave-shaped and/or wave-shaped strips. The periodic length l1 of a strip of the first group of strips adjoins a second group of strips with a periodic length l2, which are matched to each other in such a way, that the two adjoining strips are in contact with each other at at least one point, enabling a liquid transfer between these two strips. The at least one strip extends from a first end bridge to a second end bridge, wherein the two end bridges run along the transverse direction of the packing element. At least one strip of the packing element is torsioned about a longitudinal torsion line of the packing element.

15 Claims, 26 Drawing Sheets

(56) References Cited

U.S. PATENT DOCUMENTS

| | | | | |
|---|---|---|---|---|
| 4,576,763 | A | * | 3/1986 | Nutter ...................... B01J 19/30 261/94 |
| 4,600,544 | A | * | 7/1986 | Mix ...................... B01F 5/0616 202/158 |
| 5,112,536 | A | * | 5/1992 | McNulty .................. B01J 19/30 261/94 |
| 5,411,681 | A | * | 5/1995 | Seah ........................ B01J 19/30 261/94 |
| 5,543,088 | A | * | 8/1996 | Halbirt .................... B01J 19/30 261/94 |
| 5,882,772 | A | | 3/1999 | Schultes |
| 5,885,694 | A | * | 3/1999 | Schultes .................. B01J 19/30 261/112.2 |
| 7,722,945 | B2 | * | 5/2010 | Nieuwoudt ............. B01J 19/30 261/94 |
| 9,452,412 | B2 | * | 9/2016 | Ausner .................... B01J 19/30 |

FOREIGN PATENT DOCUMENTS

| | | |
|---|---|---|
| EP | 1 541 229 A1 | 6/2005 |
| GB | 1573745 A | 8/1980 |
| WO | 2013/143629 A1 | 10/2013 |

\* cited by examiner

PACKING ELEMENT FOR MASS-TRANSFER AND/OR HEAT-EXCHANGE COLUMNS OR TOWERS

CROSS-REFERENCE TO RELATED APPLICATIONS

This continuation application claims priority to PCT/EP2014/002904 filed on Oct. 29, 2014 which has published as WO 2015/062722 A1 and also the German application number 10 2013 018 190.9 filed on Oct. 30, 2013 and the German application number 20 2013 009 576.8 filed on Oct. 30, 2013, the entire contents of which are fully incorporated herein with these references.

FIELD OF THE INVENTION

The invention relates to a packing element, in particular for use in mass transfer and/or heat transfer columns or towers, through which a gas and/or liquid flows, wherein the packing element confined by a first and a second outside comprises a plurality of exchange surfaces which are essentially formed by the surfaces of wave-shaped strips having half-waves, wherein the packing element comprises at least one first group of strips, comprising at least one half-wave-shaped and/or wave-shaped strip with a first periodic length $l_1$, and at least one adjoining second group of strips, comprising at least one wave-shaped strip with a second periodic length $l_2$, wherein the wave-shaped strips extend along an imaginary axial plane of the packing element and at least one strip extends between a first end bridge and a second end bridge, the two end bridges extending in a transverse direction of the packing element, wherein the periodic length $l_1$ of a strip of the first group of strips adjoining the second group of strips, and the periodic length $l_2$ of a strip adjoining said strip of the first group of strips, are matched to each other in such a way, that the two adjoining strips are in operative contact (i.e. at least one of physically and capillary contacting) with each other at at least one point, enabling a liquid transfer between these two strips, wherein at least one strip extends from a first end bridge to a second end bridge, and wherein the two end bridges run along the transverse direction of the packing element.

BACKGROUND OF THE INVENTION

Such packing element is known from EP 0 764 462 B1 of the applicant. It provides in an advantageous manner a highly even distribution of the liquid over the individual strips, thus over the exchange surfaces of the packing element: The half-wave-shaped and/or wave-shaped structure of the strips, which essentially form the packing element, causes the liquid to distribute easily over the strips. The matching of the periodic lengths of the strips causes adjoining strips to cross at at least one point, enabling a transfer of liquid from one strip to the adjoining strip. The half-wave-shaped or wave-shaped form of each strip has the advantage that thereby an especially open structure of the packing element is provided which results in a smaller pressure drop in the column.

From EP 1 541 229 A1 a packing element for mass and/or heat exchange is known, in particular for mass and/or heat exchange columns, through which a gas flow and/or a liquid flow passes, wherein the packing element is produced from a plate and has got at least one indentation in the plate for forming two elongate strips between traverse portions of the plate. The strips between these traverse portions are being bent out of the plane passing through the traverse portions. At least one orifice is formed between the bent strips, as seen perpendicularly to the plane passing through the traverse portions. It is provided that individual strips of the known packing element are not in contact with each other.

WO 2013/143629 describes a packing element for use in mass transfer and/or heat transfer processes, through which at least one liquid can flow. The packing element has an outer surface, comprising three or more outwardly bending strip elements, and two edge elements connecting these strip elements. The packing element is shaped generally spherical or ellipsoidal.

GB 1573745 describes an essentially cylindrical packing element. Cylindrical packing element fingers are cut out of a basic element, which are bent inside towards the cylinder axis. The fingers extend in an angle between 4 and 45 degrees to the cylinder axis. According to an embodiment disclosed in this document, there are three rows of fingers with eight fingers respectively set in a row, wherein the intermediate of these three finger—rows runs parallel the cylinder axis and the upper as well as the lower row are arranged in a torsioned manner, so that their fingers have an angle of approximately 10 degrees in relation to the cylinder axis.

It is therefore an object of the present invention to improve the packing element described in EP 0 764 462 B1 mentioned before, so that an even smaller pressure drop is provided in a column or tower using the packing elements according to the invention.

SUMMARY OF THE INVENTION

This object is achieved according to the invention in that at least one strip of the packing element is torsioned about a torsion line running in the longitudinal direction of the packing element, wherein the torsion of the strip along said torsion line increases starting from the first end bridge, is at maximum in the area of a first amplitude maximum of the strip, decreases in the area between said amplitude maximum and the central section of the packing element, increases, starting from said central section, up to a second amplitude maximum of said strip and decreases in the area between said amplitude maximum and the second end bridge, and that all strips are in contact with each other in this central section in such a way that a persistent connection for the liquid is formed from the first outside to the second outside of the packing element.

By the measures according to the invention a packing element is achieved in an advantageous manner, which has a "more open" structure compared to the known packing element described in EP 0 764 462 B1, which results in a higher gas permeability and therefore a smaller resistance for the gas flow traversing the columns or towers using the packing element according to the invention.

The torsion provided according to the invention to a corresponding number of strips of the inventive packing element brings forth that the packing element has a smaller flow resistance for the impacting gas flow in a direction orthogonal to the before mentioned axial plane too, because by the torsion of the strips about their longitudinal direction, provided according to the invention, openings between adjoining strips of the packing element are formed, through which the gas flow can pass through. By the torsioned arrangement and forming of the strips of the inventive packing element, it is achieved that the edges of the individual strips are not—as is the case of the known packing element—parallel and therefore close to each other, but by the torsion of the respective strips the afore-mentioned openings are formed, through which the gas flow can pass through and the resistance, which the inventive packing element subtends the gas flow, is reduced.

Another advantage of the inventively provided torsion of one or more, preferably of all strips of the inventive packing element is that hereby an increased torsional stiffness of the packing element can be obtained, resulting in a higher stability.

An advantageous improvement of the invention provides that the last strip of a group of strips and the adjoining first strip in the following group of strips are formed alternatingly torsioned. Such a measure has the advantage that between these two strips and thus between adjoining groups of strips a vast space is provided, resulting in a smaller gas flow resistance.

Another advantageous improvement of the invention provides that adjoining strips of a group of strips are formed alternatingly torsioned.

Another advantageous improvement of the invention provides that the packing element comprises at least one strip having its first halfwave oppositely orientated to the second halfwave of this strip, wherein it is preferred that all strips in at least one group of strips of the packing element are formed as described before. Such a measure has the advantage that hereby again a particularly vast space between adjoining strips is formed.

Another advantageous improvement of the invention provides that the amplitude of the strip or the strips of at least of one of the group of strips is smaller than the amplitude of the strip or the strips of group of strips adjoining this group of strips. Such a measure has the advantage, that hereby an 'egg-shaped' or 'ball-shaped' outer contour of the packing element is formed, resulting in an enhanced pouring ability of the packing element according to the invention.

Another advantageous improvement of the invention provides that at least one strip of the packing element according to the invention comprises a stiffening element, in particular a bead, which preferably runs in longitudinal direction, and/or at least one of the end bridges and the central section of the packing element comprises such a stiffening element, again in particular a bead. Hereby the torsional stiffness of the packing element according to the invention is increased in an advantageous manner.

Further advantageous embodiments of the invention are subject of the dependent claims.

BRIEF DESCRIPTION OF THE DRAWINGS

Further details and advantages of the invention are disclosed in the preferred embodiments, which are described in the following on the figures. The figures show.

DETAILED DESCRIPTION OF THE PREFERRED EMBODIMENTS

Figure 1:
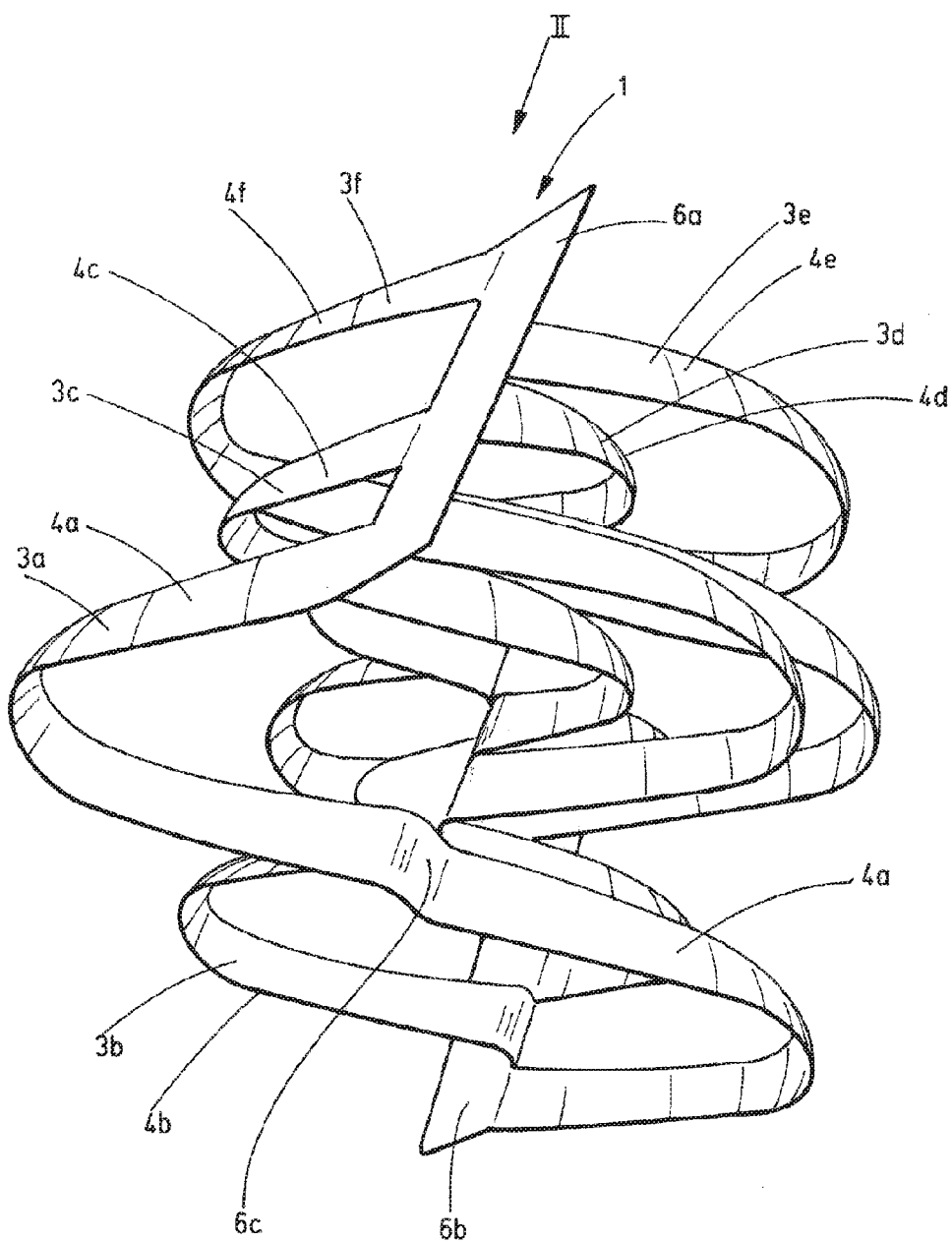
FIG. 1 is a perspective view of a first embodiment.

The packing elements described in the following, which are called "random packing elements" in the English language, are—contrary to "structured packing elements"—introduced in a column, in particular a mass transfer and/or heat transfer column, in a not orientated way by—for example—pouring the packing elements into the column. Therefore they are also called "pourable packing elements".

The first embodiment of such a packing element, generally referenced with 1, shown in FIGS. 1 to 4, comprises three groups 2a, 2b and 2c (see FIG. 3) of wave-shaped strips 3a and 3b, 3c and 3d, 3e and 3f, which surfaces form exchange surfaces 4a-4f of the packing element 1. The strips 3a, 3b or 3c, 3d or 3e, 3f of the first or second or third group of strips 2a or 2b or 2c have a periodic length $l_1$ or $l_2$ or $l_3$. From the following description it is evident for a skilled person, that the three groups are not mandatory. Rather it is possible to provide—depending on the desired purpose of use—more or less than three such group of strips 2a-2c having at least one strip 3a-3f. In a minimal version, the packing element is made of only two group of strips, each comprising only one strip. In the shown first embodiment the periodic length $l_1$ of both strips 3a, 3b of the first group of strips 2a is equal to periodic length $l_3$ of the third group of strips 2c, while both wave-shaped strips 3c, 3d of the second group of strips 2b have a periodic length $l_2$, which, in this case, is half of the periodic length $l_1$ or $l_3$ of the strips 3a, 3b or 3e, 3f of the first or third group of strips 2a or 2c.

Generalizing this construction principle, it has to be mentioned that the second periodic length $l_2$ of the strips 3c, 3d of the second group of strips 2b adjoining the first group of strips 2a, is related with the periodic length $l_1$ preferably by $l_2=l_1/n$, where n=1, 2, etc., which means that the periodic length $l_1$ is a multiple, in particular an even numbered multiple, of the periodic length $l_2$ or is essentially equal to this periodic length $l_2$.

Figure 2:
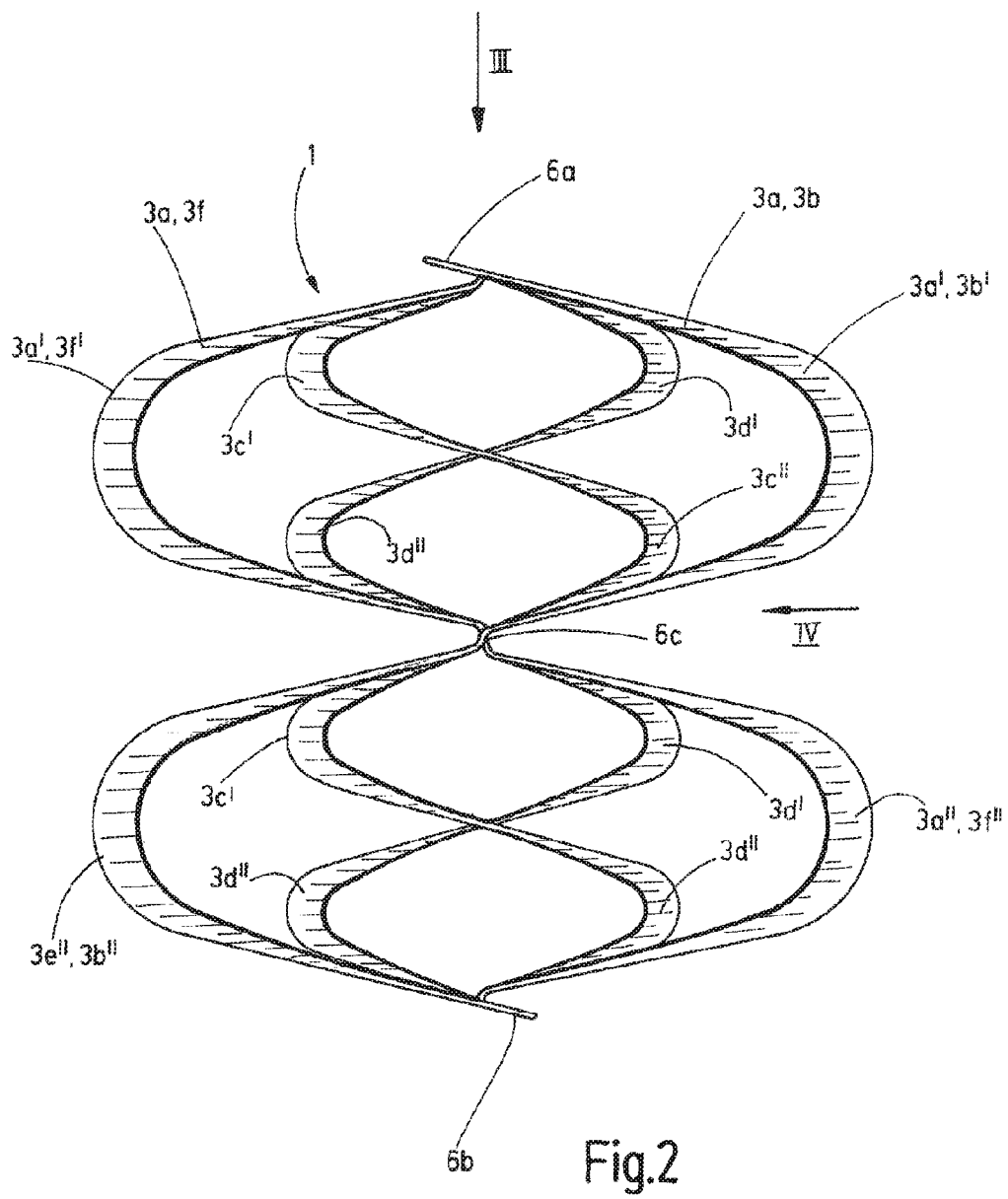
FIG. 2 is a view of the first embodiment, looking in the direction of arrow II of FIG. 1.
Figure 3:
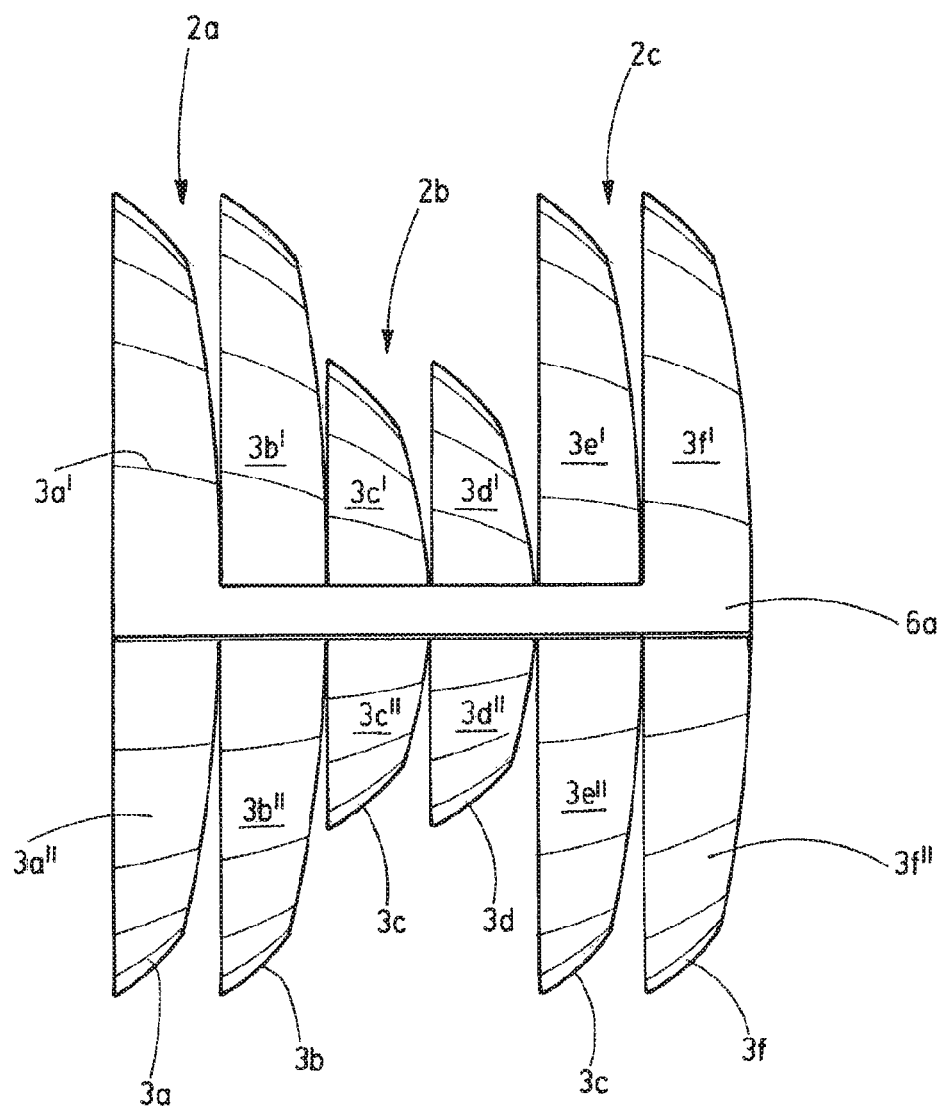
FIG. 3 is a view of the first embodiment, looking in the direction of arrow III of FIG. 2.

In this way it is achieved that all strips 3a-3f of the packing element 1—starting from its end bridges 6a, 6b—comprise a minimum amplitude in its central section 6c, so that—as it can be seen best in FIG. 2—all strips 3a-3f are in operative contact (i.e. at least one of physically and capillary contacting) with each other in this central section 6c in such a way, that a persistent connection for the liquid is formed from the left outside to the right outside of the packing element, which allows the liquid on the exchange surfaces formed by the surfaces of the strips 3a-3f to spread over the entire packing element. As used in this specification and in the claims, "physically contacting" means the strips are actually touching each other, whereas "capillary contacting" means that adjacent strips do not necessarily touch each other but are in general rather spaced apart such a small distance that fluid can move from one strip to an adjacent strip by means of capillary action. Furthermore, the use of the phrase "at least one physically and capillary contacting" means that the strips can be be (a) physically, (b) capillary or (c) physically and capillary contacting each other. In other words, the phrase can also equally be expressed as "physically and/or capillary contacting." It is further noted that a capillary action can occur when the strips are also physically contacting, as the capillary action enhances liquid transfer enabled by the contacting strips.

With regard to the gas permeability of the packing element 1, it is advantageous that adjoining strips 3a and 3b, 3c and 3d, 3e and 3f are arranged inversely phased. This can best be seen in FIGS. 1 to 3, which show for example that in the first embodiment of the packing element 1 the top half wave 3a' of the first wave-shaped strip 3a is alternatingly arranged in respect to the top half wave 3b' of the second wave-shaped strip 3b. In a corresponding manner, the bottom half wave 3a" of the first wave-shaped strip 3a is arranged alternatingly in its spatial orientation in respect to the bottom half wave 3b" of the second strip 3b of the two strips 3a, 3b belonging to the first group of strips 2a. It is also possible that this inversely phased arrangement is only provided for the opposing half waves 3a', 3b' or 3a", 3b" of two adjoining strips 3a, 3b in a group of strips 2a or 2b. It is evident for a skilled person that depending on the designated purpose of use of the packing element 1—a plurality of possibilities of the formation of the half waves 3a'-3f' of the strips 3a-3f in the group of strips 2a-2c is given. The above statements are also valid for the further group of strips 2b-2c of the packing element 1. Preferably, the alternating arrangement extends beyond the group-borders, meaning—as can be seen in FIG. 2—it is preferred that the half waves 3b', 3b" of the last strip 3b in the first group of strips 2a and the half waves 3c', 3c" of the first strip 3c of the second group of strips 2b are arranged alternatingly. In a corresponding manner, it is preferable that also the last strip 3d of the second group of strips 2b and the half waves of the first strip of the third group of strips 2c are arranged alternatingly. Another possible variant of the packing element 1 is that the strips 3a-3f of the respective group of strips 2a-2c are arranged in phase inside the respective group of strips 2a-2c, but the strips of each individual group of strips are then arranged in antiphase, which means that for example the strips 3a,3b in the first group of strips 2a are arranged in phase, but the strips 3c, 3d of the second group of strips 2b are inversely phased to the strips 3a, 3b of the first group of strips 2a.

To further improve the gas permeability of the before described packing element 1 in relation to the known packing element described at the beginning, it is provided that the strips 3a-3f of the three group of strips 2a-2c of the packing element 1 do not—as for the known packing element—run flat, but exhibit a torsion. It can be seen in particular in FIGS. 2 and 4 that the first half wave 3a' of the first wave-shaped strip 3a—seen in running direction of the strip from the upper end bridge 6a to the lower end bridge 6b—exhibit in the region between the first end bridge 6a and the central section 6c of the packing element 1 a positive, meaning clockwise, torsion which increases from the first end bridge 6a, is at its maximum at the amplitude maximum and decreases in the region between this amplitude maximum and the central section 6c of the packing element 1. The torsion of the strip 3a occurs about a—again seen in running direction of the strip 3a from top to bottom—left edge 5a" of the strip 3a, so that this edge 5a" forms the torsion line for the torsion of strip 3a. This results in that a right edge 5a' of the strip 3a is not running parallel to the left edge 5a" of the strip 3a anymore, but runs arcuately. Since the first half wave 3b' of the second strip 3b adjoining the first strip 3a runs in the same way as to the first halfwave 3a', the left edge 5b" of the second strip 3b—as does the left edge 5a" of the first strip 3a'—runs straight, while the right edge 5b' of the second strip 3b runs arcuately. The right edge 5a' of the first strip 3a runs therefore arcuately in respect to the left edge 5b" of the second strip 3b, so that in this area an opening O is formed, which causes a more open structure of the packing element in this section, which results in a higher gas permeability and therefore a lesser resistance for the gas flow, which flows through a column or tower using the packing element 1.

Figure 4:
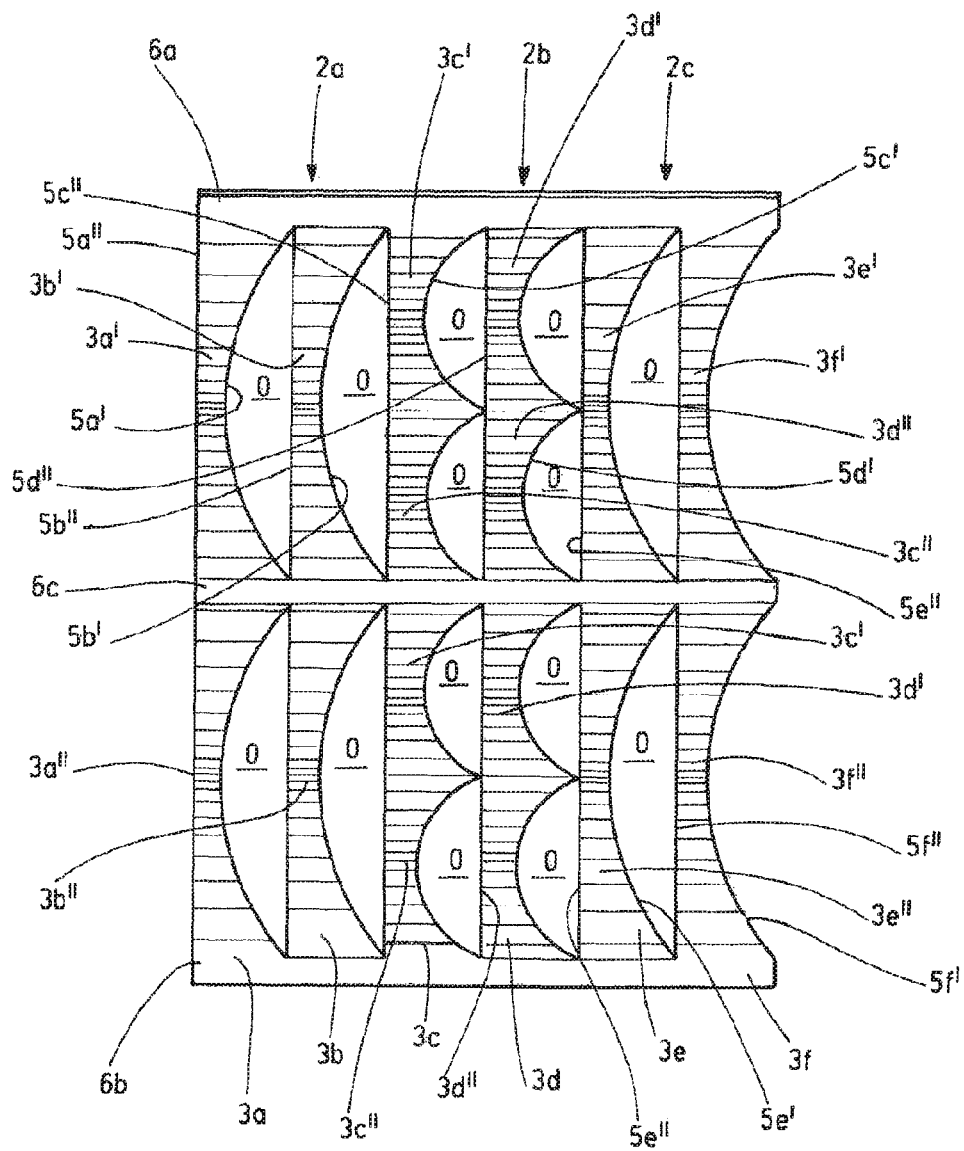
FIG. 4 is a view of the first embodiment, looking in the direction of arrow IV of FIG. 2.

The second half waves 3a" and 3b" of the first strip 3a and of the second strip 3b run—which can be again seen in FIG. 4—like the first half waves 3a' and 3b' between the central section 6c and the bottom bridge 6b positively torsioned. The explanations made for half waves 3' and 3b' therefore apply mutatis mutandis. The right edge 5a' of the second half wave 3a" of the first strip 3a is therefore again arcuately bent away from the straight running left edge 5b'" of the second strip 3b, so that also in this area an opening O of the packing element 1 is formed, which increases the open structure of the packing element 1 in this area and therefore also reduces the flow resistance in this area.

As it can be seen in particular from FIG. 4, the strips 3e and 3f of the third group 2c are formed like the strips 3a, 3b of the first group of strips 2a, so that a repeated explanation is not necessary.

The two strips 3c and 3d of the second group of strips 2b, which in the shown case—as mentioned before—have a periodic length $l_2=l_1/2$, have therefore in their extent between the top end bridge 6a and the bottom end bridge 6b of the packing element 1 two waves, respectively, with a first half wave 3c' and a second half wave 3c". The first half wave of the first, in the figures top wave therefore runs in its section between the top end bridge 6a and its amplitude minimum—again seen from a direction running top to bottom—positively torsioned, therefore like the first half wave 3a' of the first strip 3a, but only with a smaller length of $l_2/2$. The second half wave 3c" of the, in the figures, top wave of the two waves of the third strip 3c runs adjoiningly up to the central section 6c of the packing element 1 and is again positively torsioned, thus the same as the second half wave 3a'' of the first strip 3a, but again with proviso that this torsion of the third strip 3c occurs over the shorter section $l_{2/2}$.

The, in the figures, bottom wave of the third strip 3c of the second group of strips 2b is formed as the, in the figures, top wave described before, wave of the third strip 3c of the packing element 1, so that the design of this section of strip 3c of the packing element 1 does not need to be described in detail. This is also valid for the formation of the fourth strip 3d in the second group of strips 2b, because this—as can be seen in the figures—is formed like the third strip 3c.

The respective right edges 5c' and 5d' of the strips 3c and 3d of the second group of strips 2b run in the area of the first half waves 3c' and 3d' arcuatedly bent towards the respective left edges 5d'' and 5e'' of the strips 3d or 3e adjoining the strips 3c or 3d, so that in the area between the first end bridge 6a and the central section 6c two openings O are respectively formed, which have the before mentioned properties and effects. The same applies to the respective right edges 5c' and 5d' of the second half waves 3c'' and 3d'' of the strips 3c and 3d in the area between the central section 6c and the second end bridge 6b. The extent of each half wave 3c', 3d' as well was 3c'' and 3d'' of the second group of strips 2b corresponds thus with the extent of the strips 3a, 3b or 3e, 3f of the first or the third group of strips 2a or 2c, respectively, with the proviso that the strips 3c, 3d in the second group of strips 2b only have the periodic length $l_2$.

The embodiment above shows a packing element 1 with three group of strips 2a-2c with each two strips 3a and 3b, 3c and 3d, 3e and 3f, which are orientated in phase and torsioned respectively. Thus each strip 3a-3f is torsioned in the same direction, that means within each group of strips 2a-2c the strips 3a-3f have the same torsion direction. This is, however, not mandatory.

Figure 5:
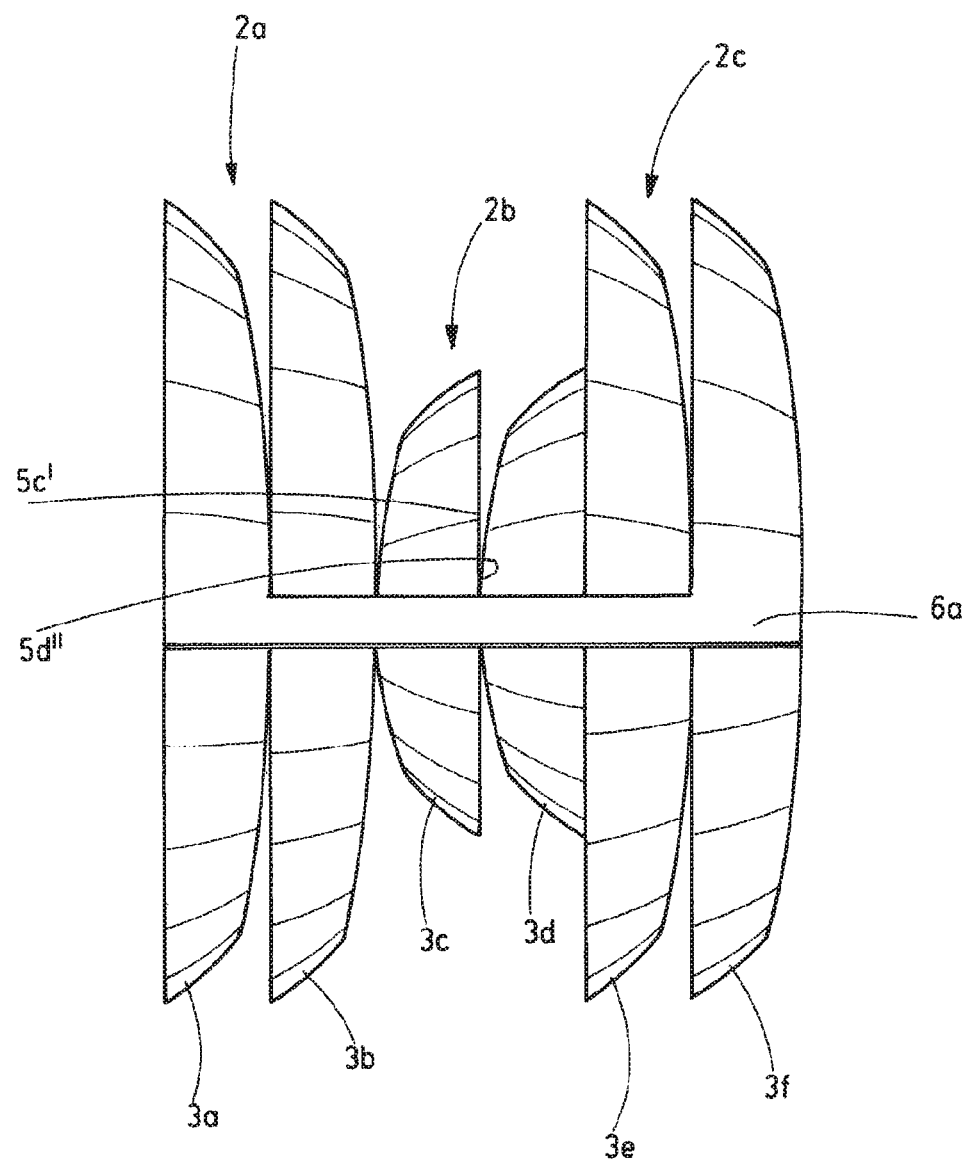
FIG. 5 is a view of a second embodiment, looking in a direction corresponding to arrow III of FIG. 2.
Figure 6:
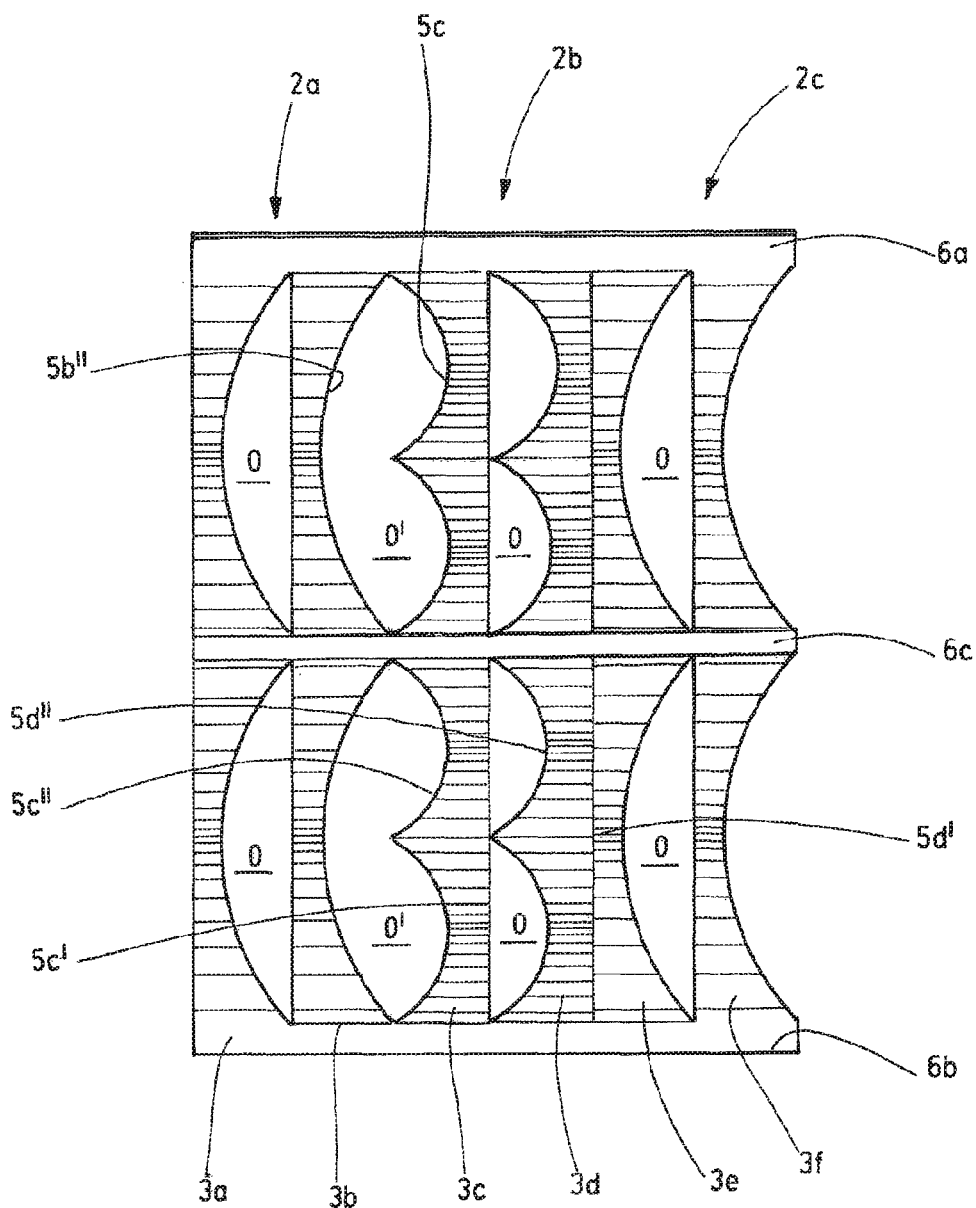
FIG. 6 is a view of the second embodiment, looking in a direction corresponding to arrow IV of FIG. 2.

In FIGS. 5 and 6 a second embodiment of a packing element 1 is shown, wherein the packing element 1 has again three group of strips 2a-2c, each having two strips 3a, 3b or 3c, 3 or 3e, 3f. As can be seen when comparing FIGS. 5 and 6 to the FIGS. 3 and 4, the strips 3a, 3b and 3e, 3f of the first and of the third group of strips 2a and 2c are formed the same in the first and in the second embodiment, so that the design, function and effect of these strips 3a, 3b and 3e, 3f require no further explanation. The difference between the two embodiments is, that the strips 3c and 3d in the second group of strips 2b—as can be seen in FIG. 5 in particular—are not—as the corresponding strips 2c, 2d of the second group of strips 2b of the first embodiment torsioned clockwise in their running direction, therefore positively torsioned, but are negatively torsioned, therefore anticlockwise. The strips 3c, 3d in the second group of strips 2b are thus oppositely orientated in respect to their torsion to the strips 3a, 3b of the first group of strips 2a and the strips 3e, 3f of the third group of strips 2c. This causes that—as can best be seen in FIG. 6—the packing element 1 has, in particular in its transition area between the first group of strips 2a and the second group of strips 2b, in an advantageous manner an especially open structure: as can be seen easily from the afore-mentioned figure, the second strip 3b of the first group of strips 2a adjoins the first strip 3c of the second group of strips 2b runs in such a manner, that its right edge 5b' is bent away from the left edge 5c'' of the third strip 3c, while additionally the left edge 5c'' of the third strip 3c is bent away in opposite direction from the right edge 5b' of the second strip 3b, so that there is—as indicated by the big openings O' in FIG. 6—a vast space between these two strips 3b, 3c, resulting in a small gas flow resistance.

As can be seen further from FIGS. 5 and 6, a liquid transfer between the two strips 3c, 3d is possible, despite of the torsioned design of the strips 3c, 3d, because the left edge 5d'' of the strip 3d and the right edge 5c' of the strip 3c contact each other or at least are close to each other in one or more areas, so that a capillary liquid transfer between the strips 3c and 3d is possible.

Figure 7:
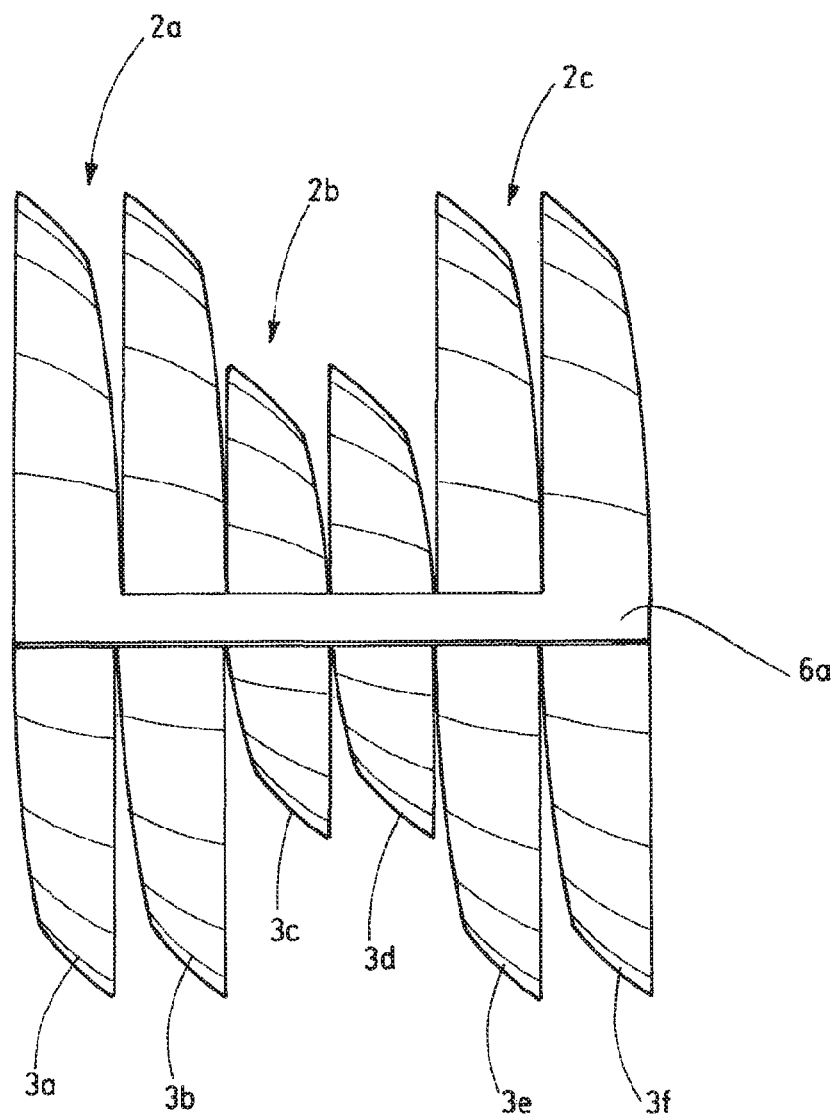
FIG. 7 is a view of a third embodiment, looking in a direction corresponding to arrow III of FIG. 2.
Figure 8:
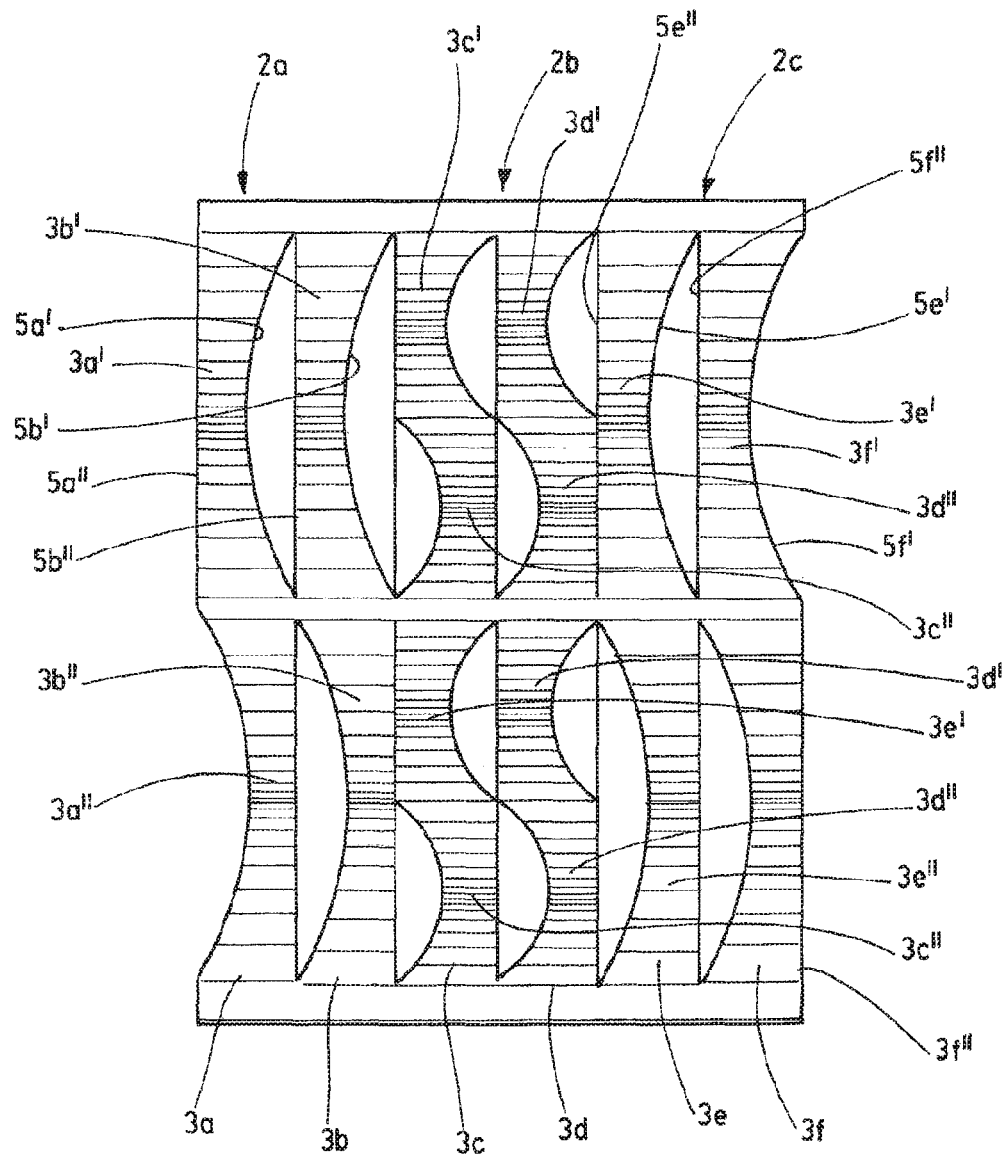
FIG. 8 is a view of the third embodiment, looking in a direction corresponding to arrow IV of FIG. 2.

In FIGS. 7 and 8 a third embodiment of a packing element 1 is shown, which corresponds in its basic design with the one of the first embodiment. Corresponding parts of the packing element 1 are therefore provided with the same reference signs as in the first embodiment; thus, their design, function and effect are not described further. The packing element again comprises three group of strips 2a-2c with two strips 3a, 3b or 3c, 3d or 3e, 3f each. The difference to packing element 1 of the first embodiment is that the first half waves 3a'-3f' of each strip 3a-3f and the second half waves 3a''-3f'' of these strips 3a-3f are orientated oppositely in respect to their torsion: the first half waves 3a', 3b' of the strips 3a, 3b of the first group of strips 2a and the first half waves 3e', 3f' of the strips 3e, 3f of the third group of strips 3c of the packing element 1 of the third embodiment are formed like the first half waves 3a', 3b', 3e', 3f' of the strips 3a, 3b, 3d, 3e of the packing element 1 of the first embodiment, exhibit therefore a positive clockwise torsion, seen in their running direction, so that the respective left edges 5a'', 5b'', 5e'', 5f''' of the first half waves 3a', 3b', 3e', 3f'—as can best be seen in FIG. 8—run straight, while the respective right edges 5a', 5b', 5e', 5f' of these half waves of the strips 3a, 3b, 3e, 3f, in the projection of FIG. 8, have a left-bent course. The second half waves 3a'', 3b'', 3e'', 3f''' of the strips 3a, 3b, 3e, 3f are now oppositely orientated, meaning they have an anticlockwise, therefore negative torsion. Consequently, as can be seen in FIG. 8, their respective right edges 5a', 5b', 5e', 5f', in the projection of FIG. 8, are running straight in the area of the second half waves 3a'', 3b'', 3e'' and 3f'', while the respective left edges 5a'', 5b'', 5e''', 5f''' in this area have a right-bent course. The same applies to the strips 3c, 3d of the second group of strips 2b, which have a periodic length $l_2$, which is—in the here described embodiment—only half of the periodic length $l_1$ of the strips 3a, 3b, 3e, 3f of the group of strips 2a, 2c. The respective first half waves 3c', 3d' of the two waves of the strips 3c, 3d have a clockwise torsion, while the respective adjoining half waves 3c'', 3d'' are torsioned anticlockwise. The openings O of FIG. 8 show that, in comparison to the known packing element, where the strips are running straight, an increased gas permeability is given.

Figure 9:
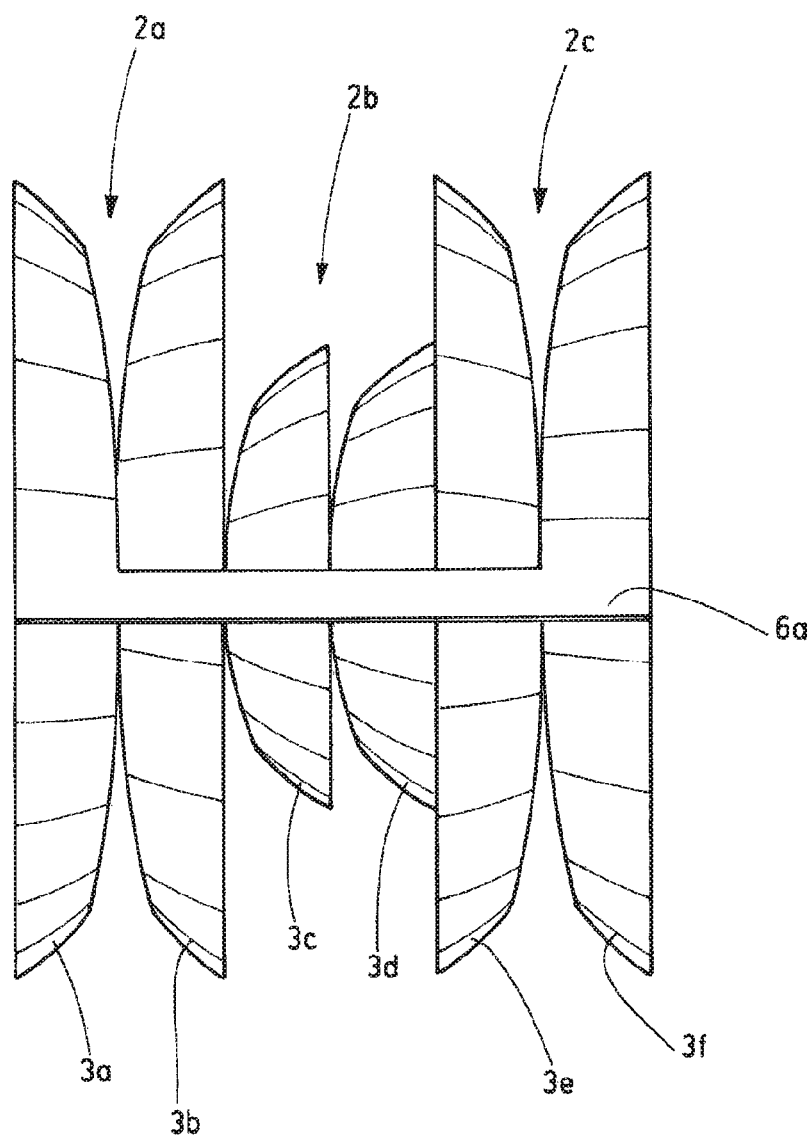
FIG. 9 is a view of a fourth embodiment, looking in a direction corresponding to arrow III of FIG. 2.
Figure 10:
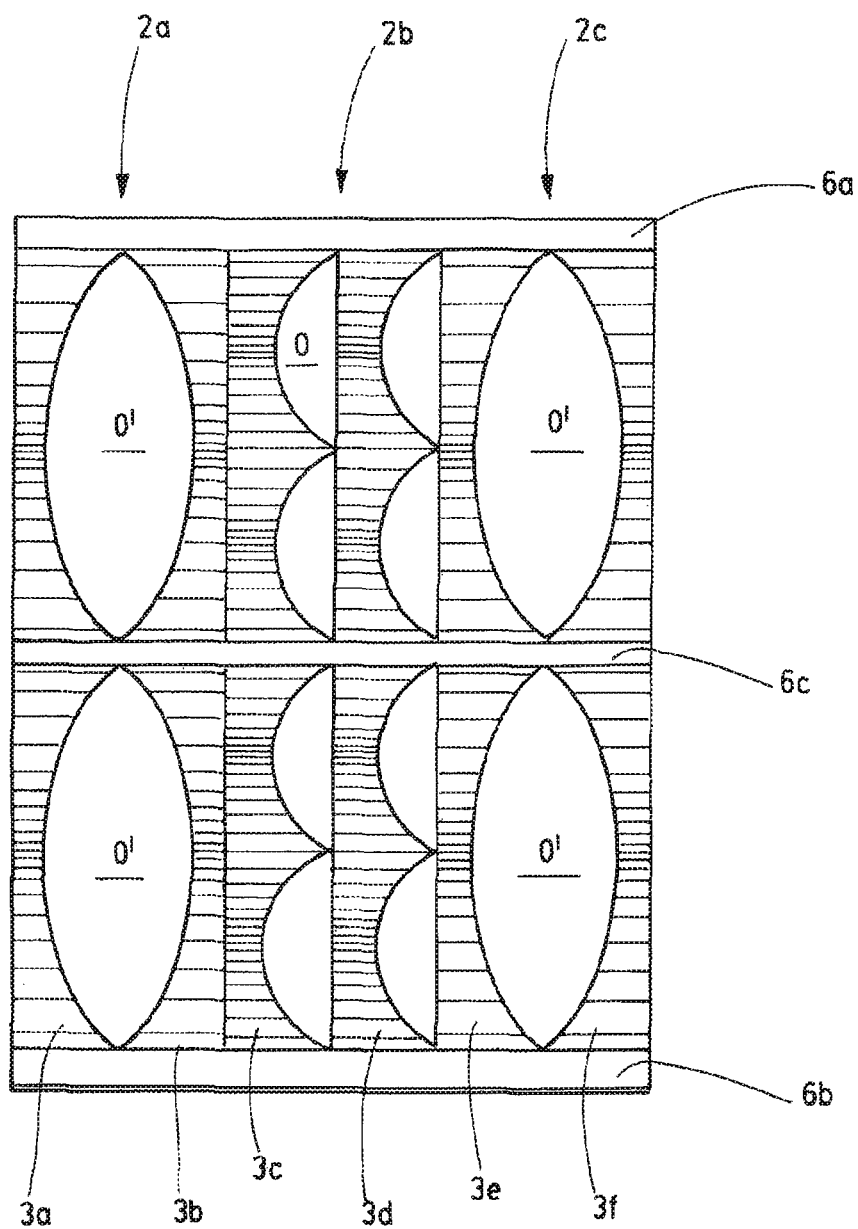
FIG. 10 is a view of the fourth embodiment, looking in a direction corresponding to arrow IV of FIG. 2.

In FIGS. 9 and 10 a fourth embodiment is shown, corresponding in its basic design to the one of second embodiment, so that corresponding components are provided with the same reference signs and are not explained further regarding their design, function and effect. The essential difference between the second and the fourth embodiment is, that the strips 3a, 3b and 3e, 3f of the first and the third group of strips 2a and 2c are torsioned alternatingly. While in the second embodiment the afore-mentioned strips 3a, 3b and 3e, 3f show a positive torsion each, in the fourth embodiment it is provided that the first strips 3a or 3e of the first or the third group of strips 2a or 2c are positively torsioned, while the adjoining strip 3b or 3f is negatively torsioned. Such a measure has the effect—as can best be seen in FIG. 10—that the described packing element 1—as can easily be seen from FIG. 10—has in the area of the outer group of strips 2a, 2c, as a result of the afore-mentioned formation of the respective strips in the first and the third group of strips 2a, 2c particularly, large openings O' between adjoining strips 3a, 3b and 3e, 3f of the group of strips 2a, 2c, therefore a particularly open structure in these areas.

Figure 11:
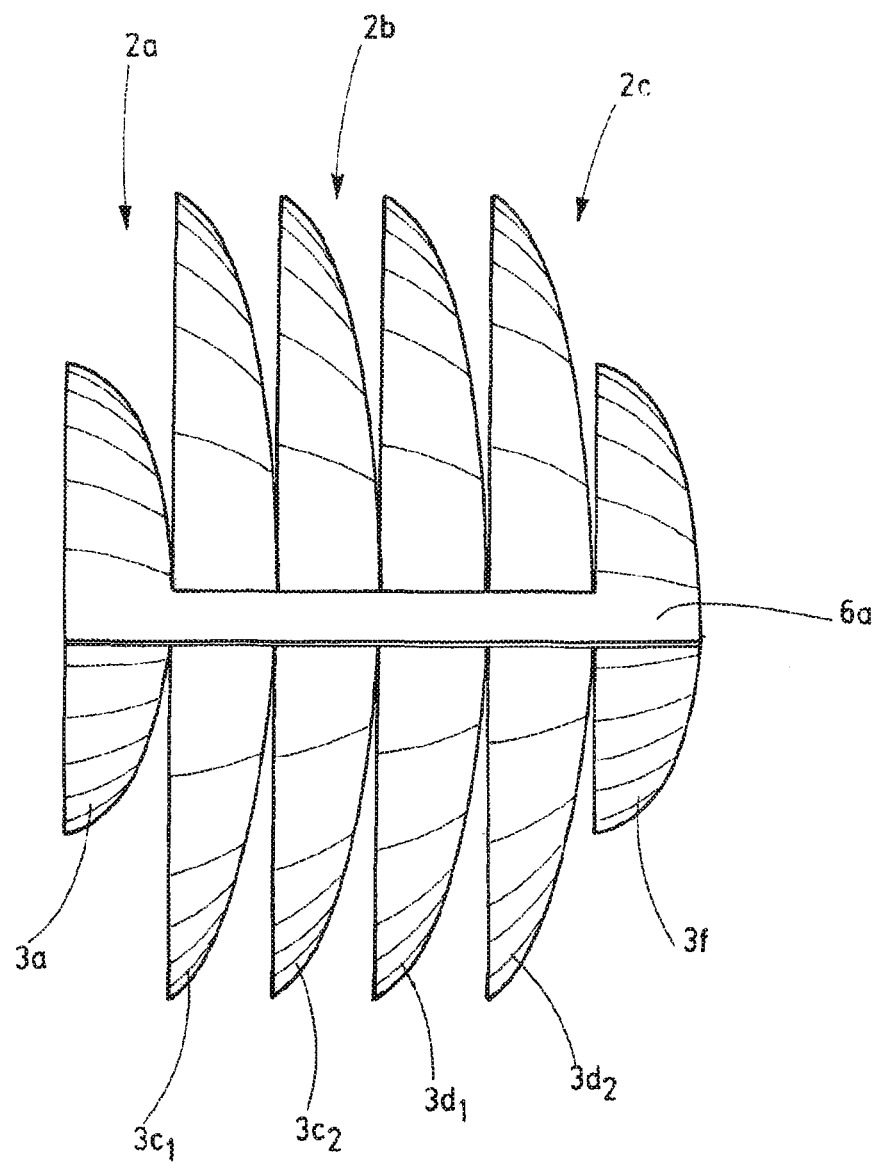
FIG. 11 is a view of a fifth embodiment, looking in a direction corresponding to arrow III of FIG. 2.
Figure 12:
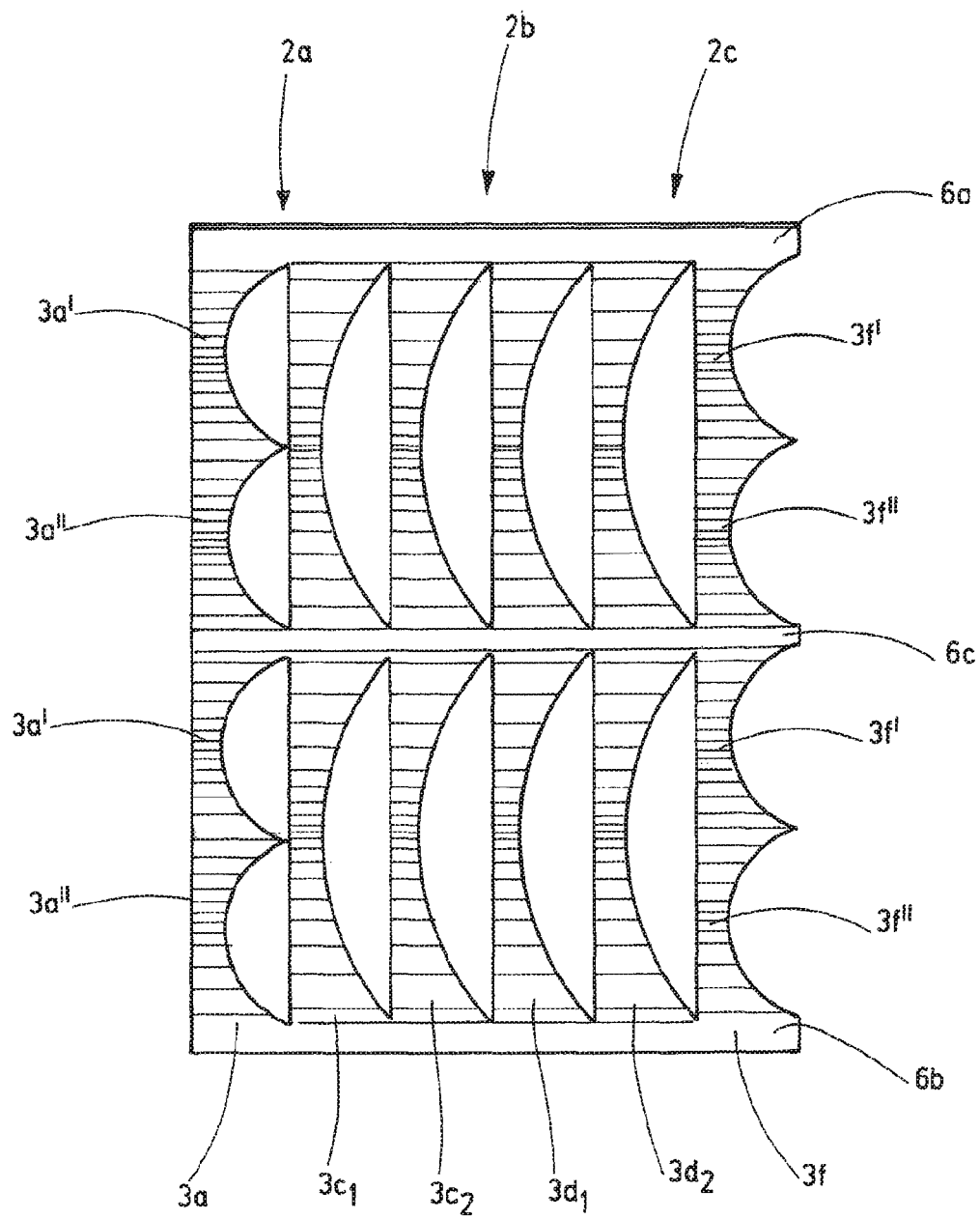
FIG. 12 is a view of a fifth embodiment, looking in a direction corresponding to arrow IV of FIG. 2.

In FIGS. 11 and 12 a fifth embodiment is shown, wherein again corresponding elements are provided with the same reference signs and are not further described regarding their design, effect and function. The packing element 1 of the fifth embodiment has three group of strips 2a-2c, wherein the first and the third group of strips 2a and 2c each only have one strip 3a or 3f. As can best be seen from FIG. 12, the two outer strips 3a and 3f of the packing element 1 comprise each two waves with a first and a second half wave 3a', 3a" and 3f', 3f" respectively. The design of the strips 3a and 3f of the fifth embodiment therefore corresponds to the one of the strips 3c, 3d of the second group of strips 2b of the first embodiment. The second group of strips 2b has four strips $3c_1$, $3c_2$, $3d_1$, $3d_2$, their design corresponds to the one of the strips 3a, 3b or 3e, 3f of the first and third group of strips 2a and 2c of the afore-mentioned embodiments. As can best be seen in FIG. 12, via the design of the 'edge strips' 3a and 3f of the packing element 1 with a smaller amplitude than the one of the 'central strips' $3c_1$-$3d_2$ of the second group of strips, a packing element 1 is formed which, due to its "egg-shaped" outer contour, provides in an advantageously manner not only a minor flow resistance, but also an enhanced pourability.

Figure 13:
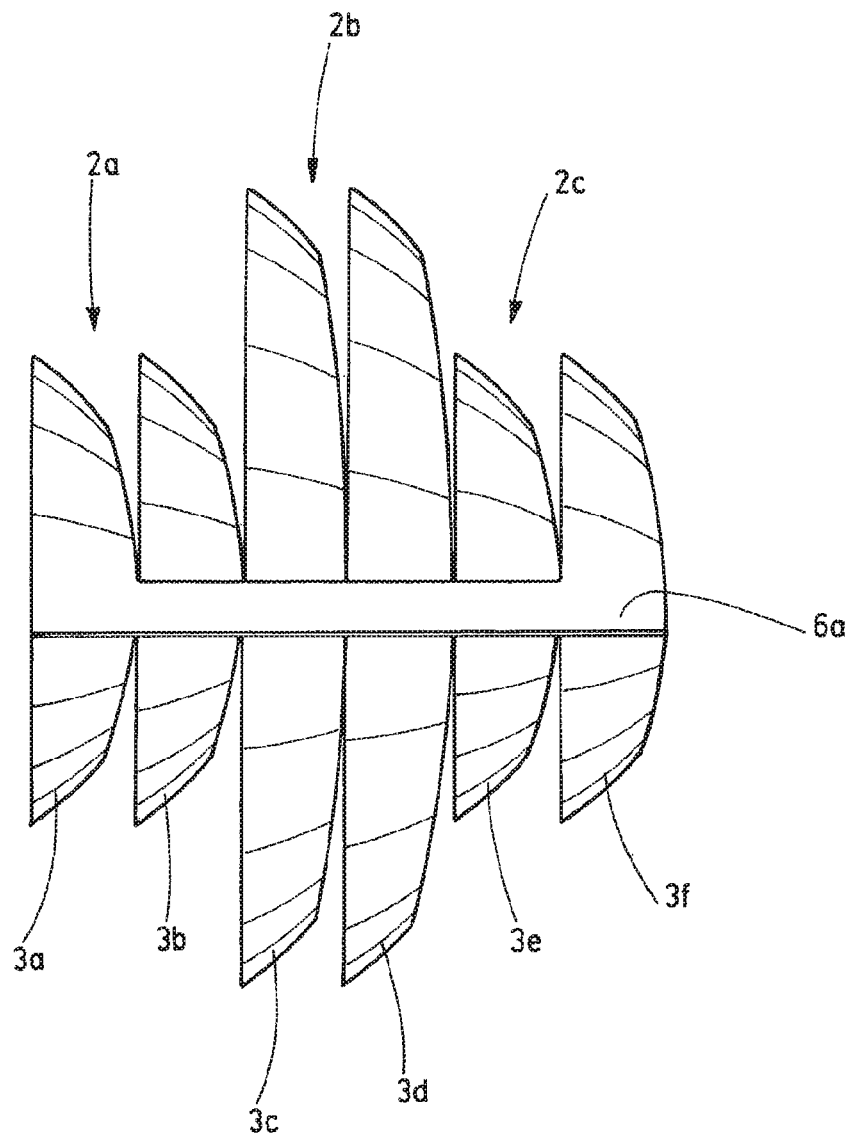
FIG. 13 is a view of a sixth embodiment, looking in a direction corresponding to arrow III of FIG. 2.
Figure 14:
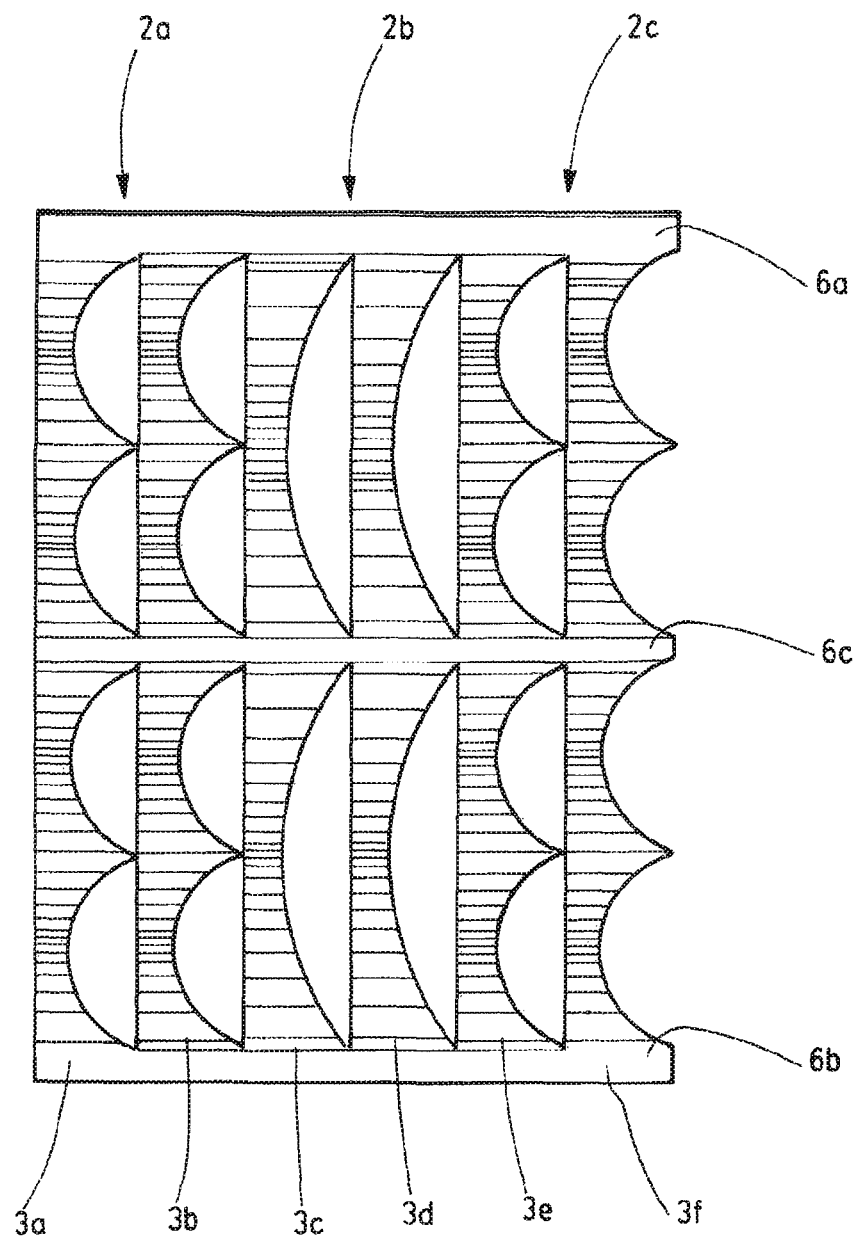
FIG. 14 is a view of the sixth embodiment, looking in a direction corresponding to arrow IV of FIG. 2.

In FIGS. 13 and 14 a sixth embodiment of a packing element 1 is shown, wherein again corresponding elements are provided with the same reference signs and are not described further regarding their design, function and effect. The packing element 1 shown in these figures is a variation of the packing element of the fifth embodiment and comprises again three group of strips 2a-2c with each having two strips 3a, 3b, 3c, 3d, and 3e, 3f respectively. While in the fifth embodiment it is provided that the first and the third group of strips 2a and 2c each have only one strip, and the second group of strips 2b has four strips $3c_1$-$3d_2$, in the sixth embodiment of the packing element 1 again the design known from the first four embodiments is accomplished, namely, each of the three group of strips 2a-2c has two strips 3a, 3b or 3c, 3d or 3e, 3f. While now the strips 3a, 3b and 3e, 3f of the respective outer group of strips 2a and 2c are provided—as in the before mentioned embodiment—with a smaller amplitude than the strips of the middle group of strips 2b, again an enhanced pourability is achieved, because the such formed "ball shaped" packing element 1 has a "round" outer contour, when seen in the projection of FIG. 13.

Figure 15:
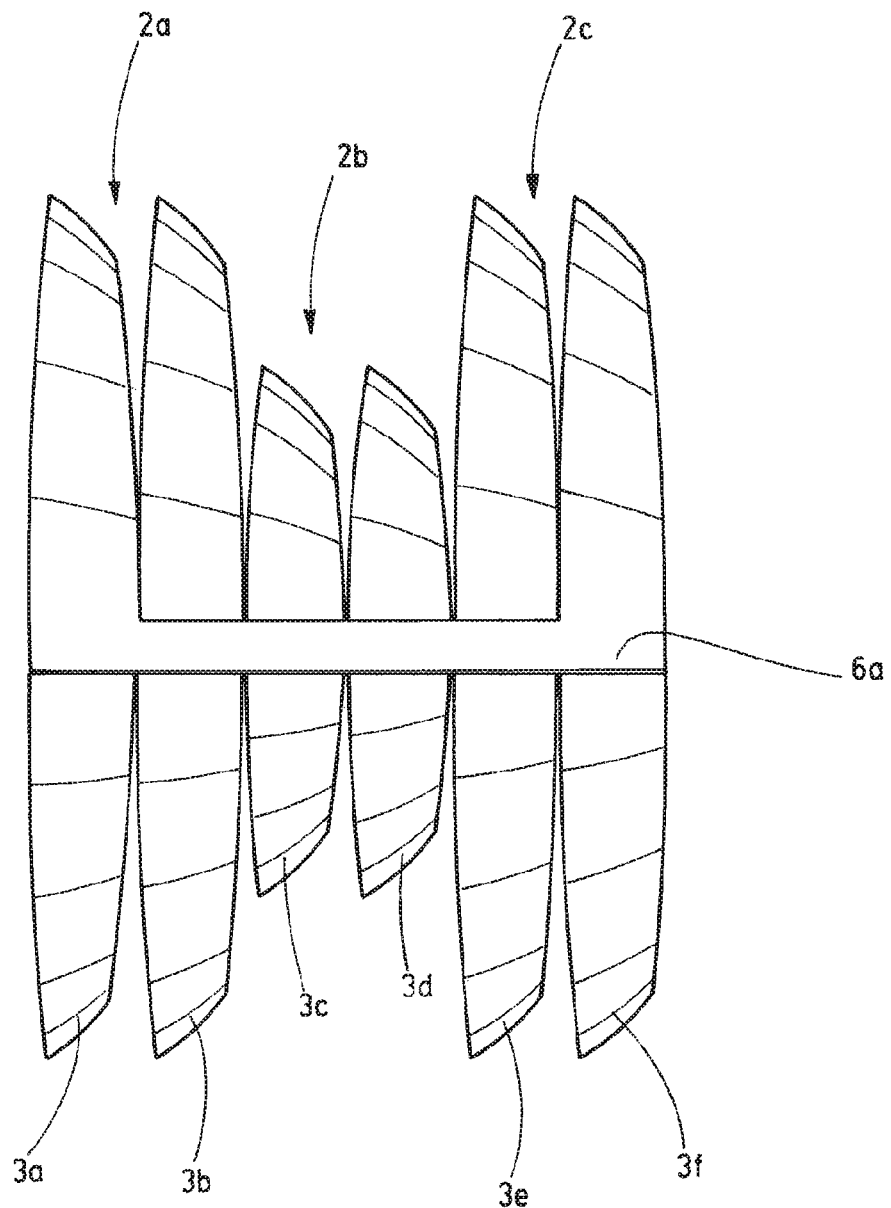
FIG. 15 is a view of a seventh embodiment, looking in a direction corresponding to arrow III of FIG. 2.
Figure 16:
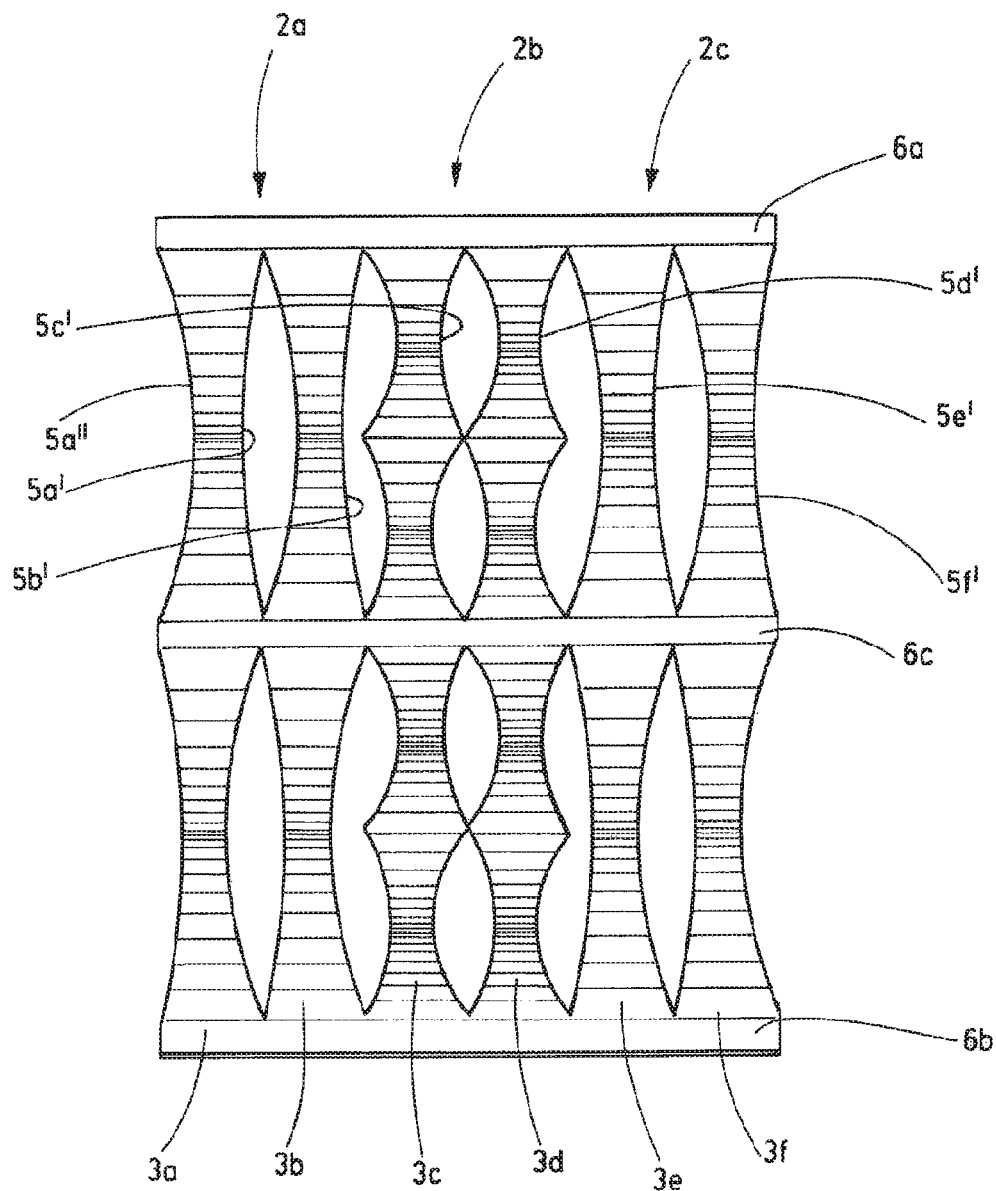
FIG. 16 is a view of the seventh embodiment, looking in a direction corresponding to arrow IV of FIG. 2.

In FIGS. 15 and 16 a seventh embodiment of the packing element is shown, which corresponds in its basic design to the first embodiment, so that again corresponding elements are provided with the same reference signs and are not described further regarding their design, function and effect. The essential difference between the first and the seventh embodiment is that—as a comparison of FIGS. 3 and 4 as well as 15 and 16 shows—the torsion of the strips 3a-3f is no more occurring about a torsion line, which coincides with the left edge 5a"-5f" of the strips 3a-3f, but that it is provided that the torsion of these strips occurs about a—imaginary—torsion line, which runs centrally through the respective strips 3a-3f. This can be seen from a comparison of FIGS. 15 and 16 with FIGS. 3 and 4. The difference to the first embodiment is that the respective left edges 5a"-5f" of the strips 3a-3f of the packing element 1 of those embodiments do not run—as the left edges 5a"-5f" of the strips 3a-3f of the packing element 1 of the first embodiment—straight, but have—corresponding to the right edges 5a'-5f' of the strips 3a-3f of the first embodiment—a bent course.

Figure 17:
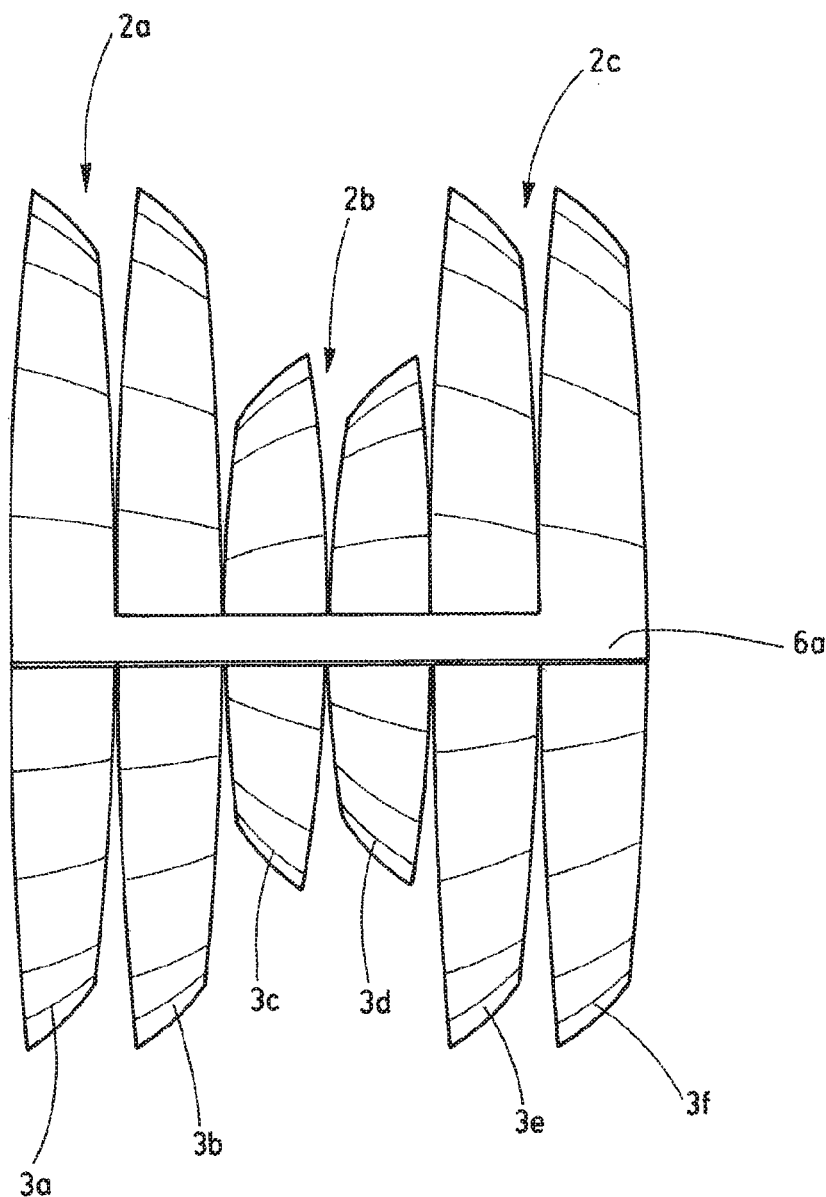
FIG. 17 is a view of an eighth embodiment, looking in a direction corresponding to arrow III of FIG. 2.
Figure 18:
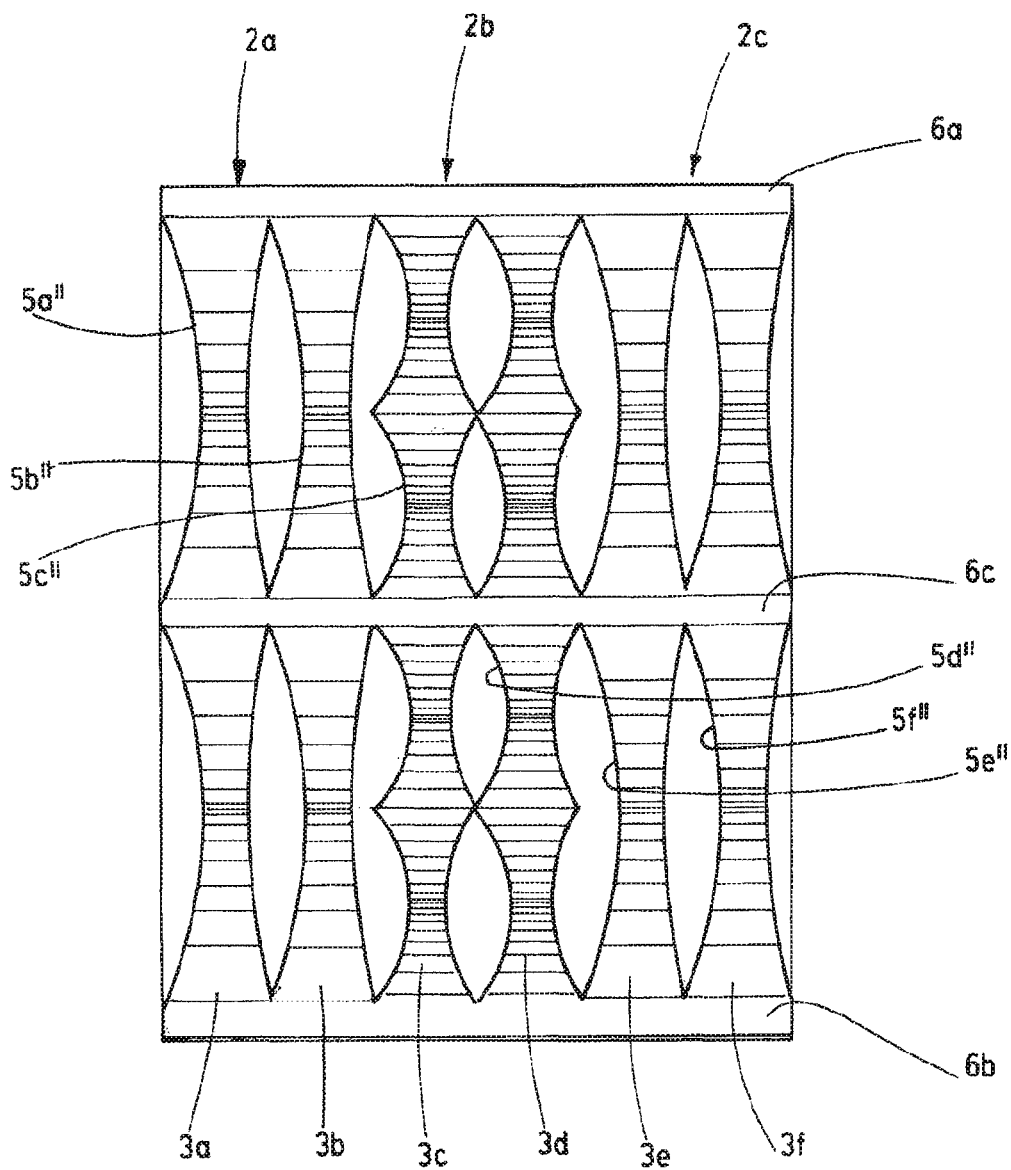
FIG. 18 is a view of the eighth embodiment, looking in a direction corresponding to arrow IV of FIG. 2.

In FIGS. 17 and 18 an eighth embodiment of a packing element is shown, the basic structure of which corresponds to the second embodiment of FIGS. 5 and 6. Corresponding elements are therefore again provided with the same reference signs and are not described further regarding their design, function and effect. The essential difference between the second and the seventh embodiment is again given by the fact that in this embodiment—as in the sixth embodiment—the torsion of the strips 3a-3f is not—as in the second embodiment—occuring about a torsion line coinciding with the respective left edge 5a"-5f" of the individual strips 3a-3f, but again is about an (imaginary) torsion line, which lies in the central section of each strip 3a-3f.

Figure 19:
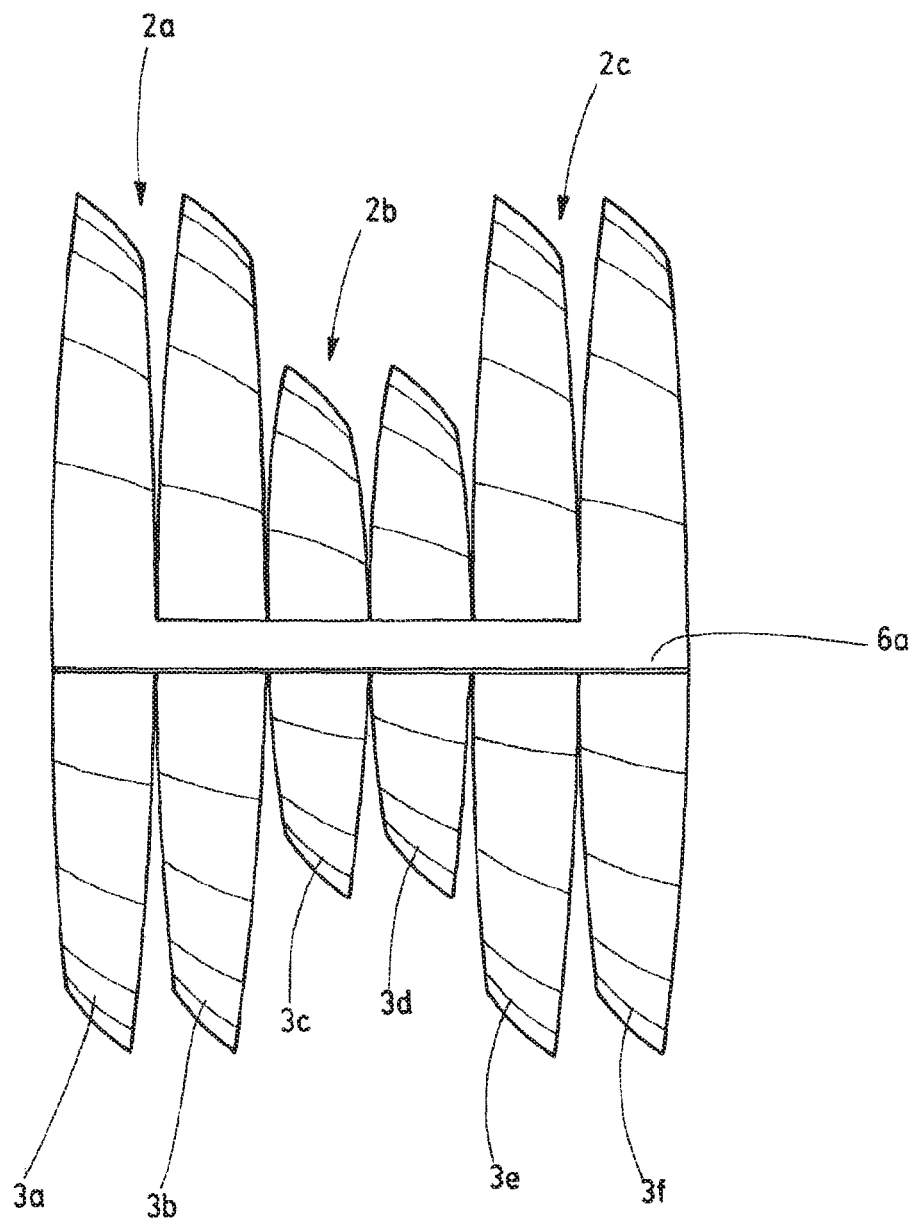
FIG. 19 is a view of a ninth embodiment, looking in a direction corresponding to arrow III of FIG. 2.
Figure 20:
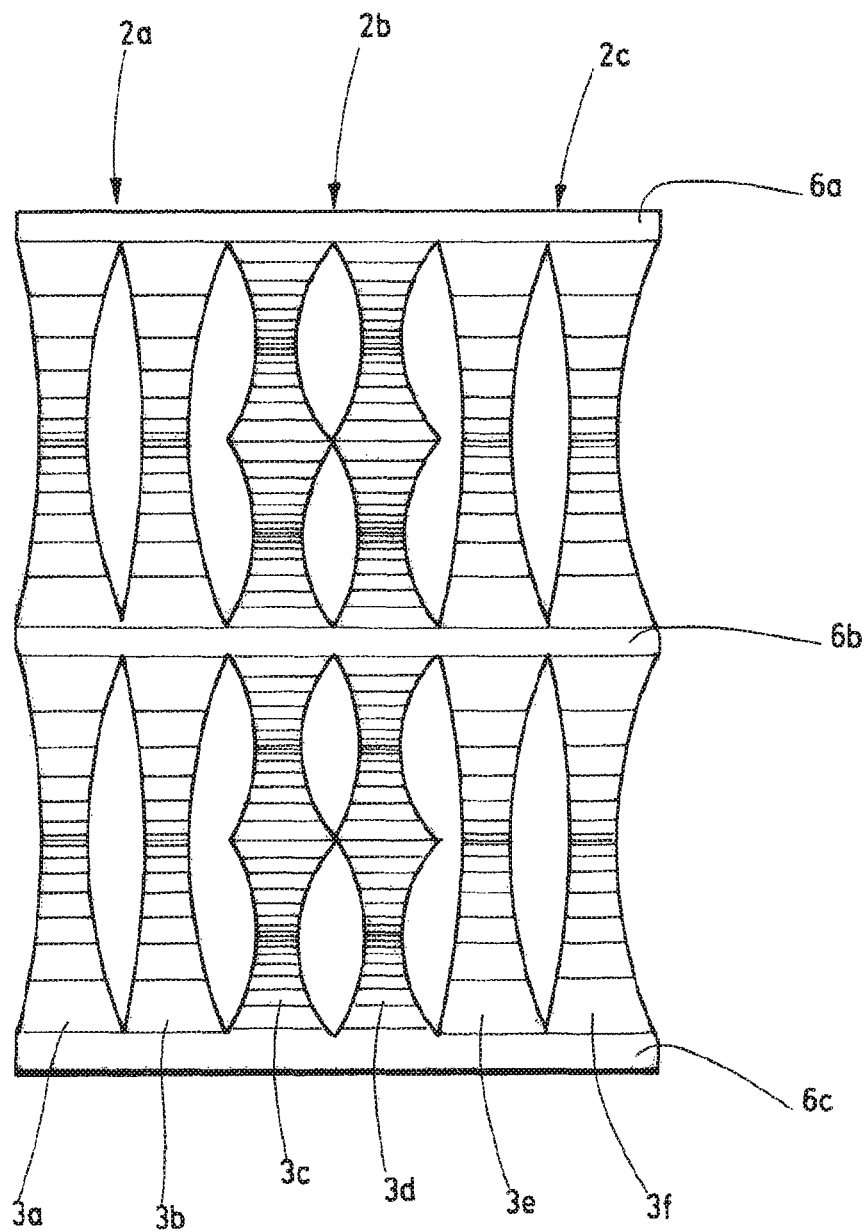
FIG. 20 is a view of the ninth embodiment, looking in a direction corresponding to arrow IV of FIG. 2.

In FIGS. 19 and 20 a ninth embodiment is shown, which corresponds in its basic structure to the one of the third embodiment of the FIGS. 7 and 8, so again corresponding elements are provided with the same reference signs and are not described further regarding their design, function and effect. Again, the essential difference between the ninth embodiment of FIGS. 19 and 20 and the third embodiment of FIGS. 7 and 8 is—as in the afore described embodiments—that the torsion of the strips is not occurring about a torsion line, which is coinciding with the left edge 5a"-5f" of each of the strips 5a-5f, but again is carried out about a torsion line approximately lying in the middle of each strip 3a-3f.

Figure 21:
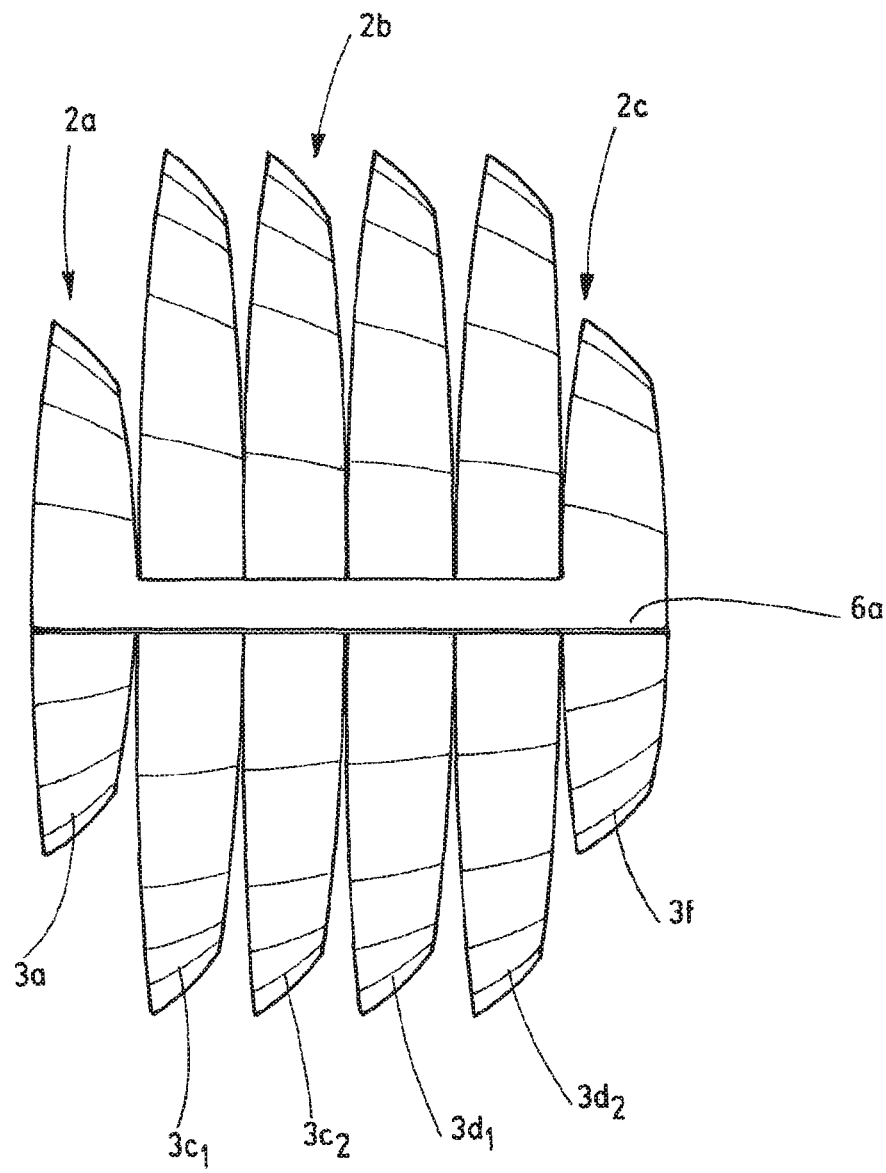
FIG. 21 is a view of a tenth embodiment, looking in a direction corresponding to arrow III of FIG. 2.
Figure 22:
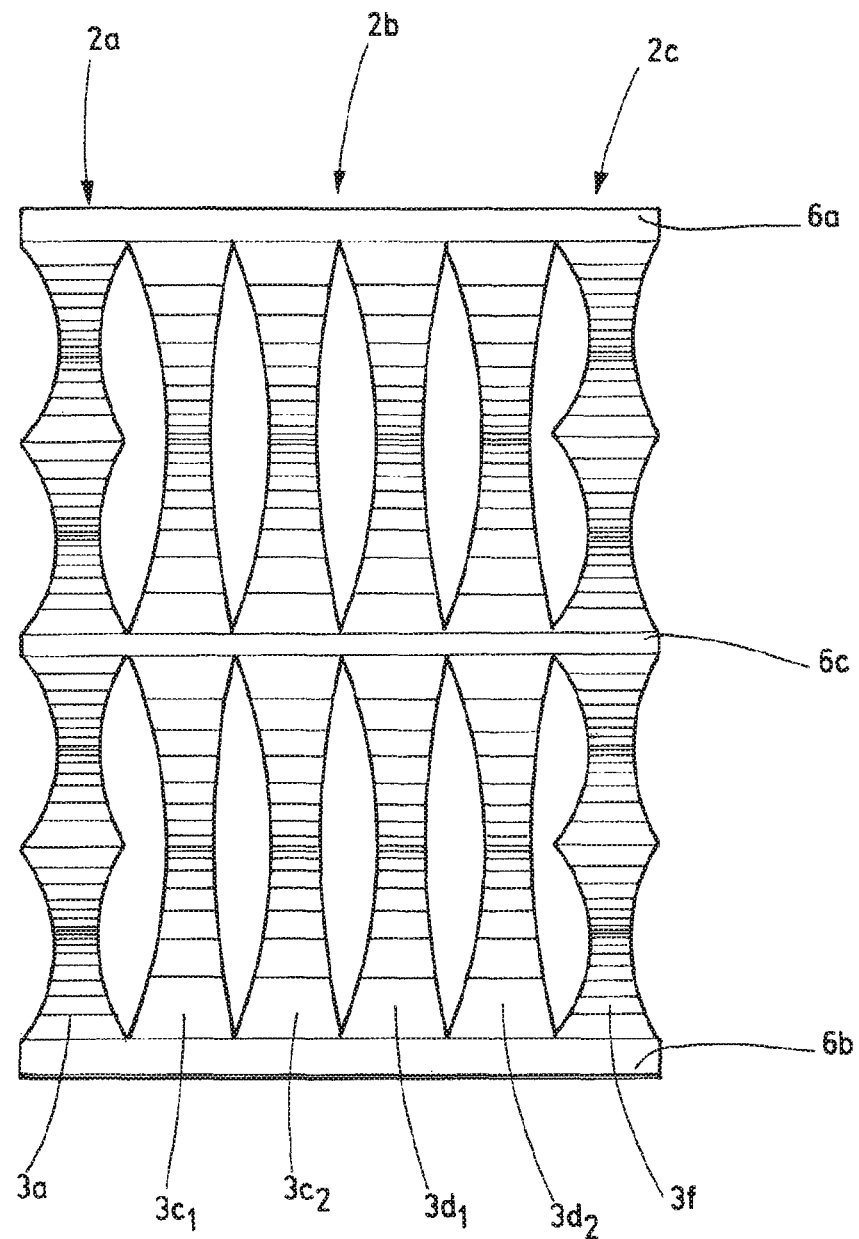
FIG. 22 is a view of the tenth embodiment, looking in a direction corresponding to arrow IV of FIG. 2.

In FIGS. 21 and 22 a tenth embodiment of a packing element 1 is shown, which corresponds in its basic structure to the FIGS. 11 and 12 of the fifth embodiment, so that again corresponding elements are provided with the same reference signs and are not described further regarding their design, function and effect. Again, the difference between the two before mentioned embodiments is that the torsion of the strips 3a-3f occurs about a torsion line lying in the middle of the respective strip.

Figure 23:
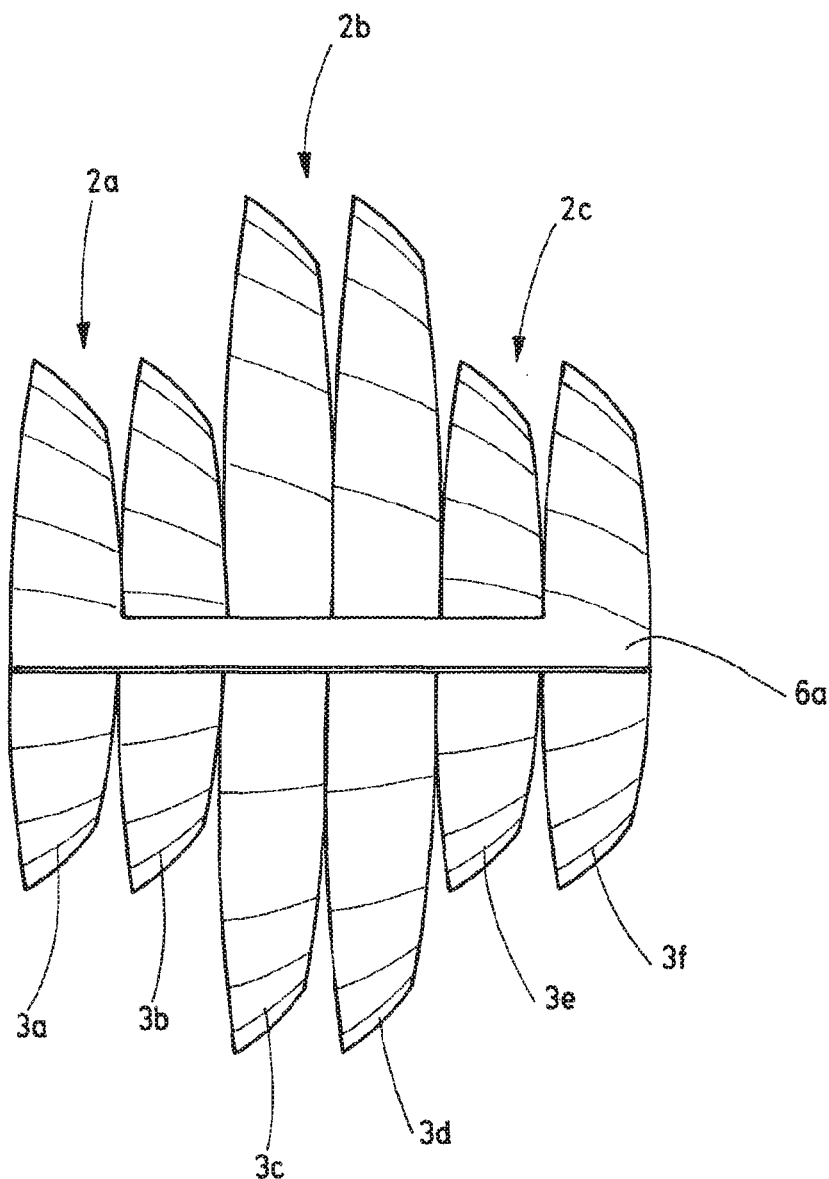
FIG. 23 is a view of an eleventh embodiment, looking in a direction corresponding to arrow III of FIG. 2.
Figure 24:
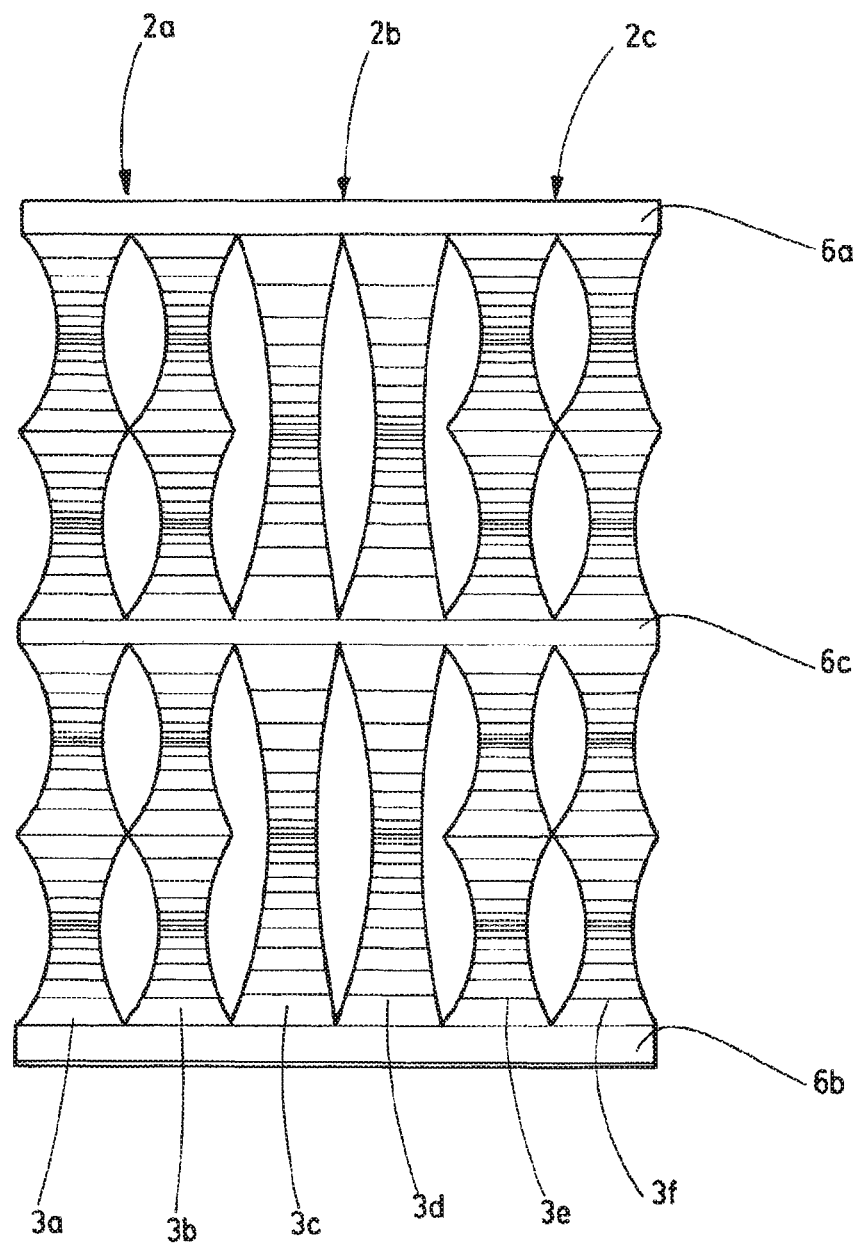
FIG. 24 is a view of the eleventh embodiment, looking in a direction corresponding to arrow IV of FIG. 2.

The same applies to the eleventh embodiment of a packing element 1 shown in FIGS. 23 to 24, which corresponds in its basic structure to the embodiment of FIGS. 13 and 14.

Figure 25:
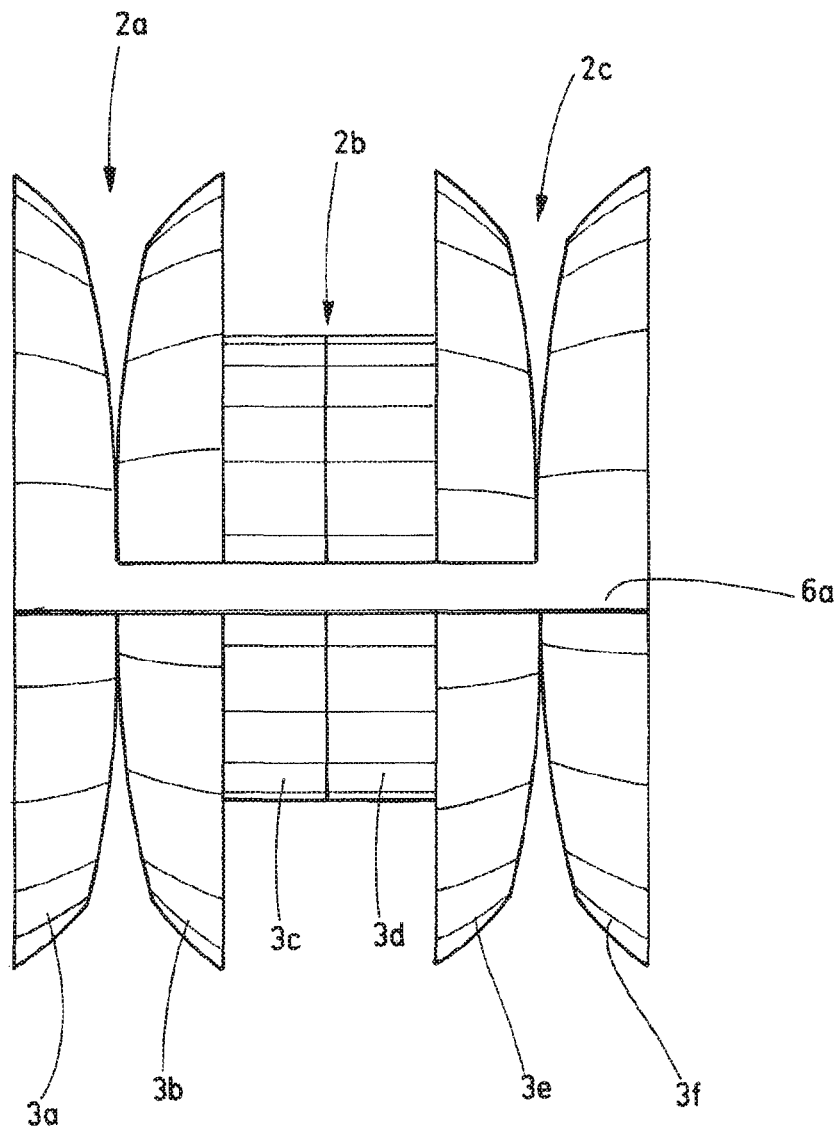
FIG. 25 is a view of a twelfth embodiment, looking in a direction corresponding to arrow III of FIG. 2.
Figure 26:
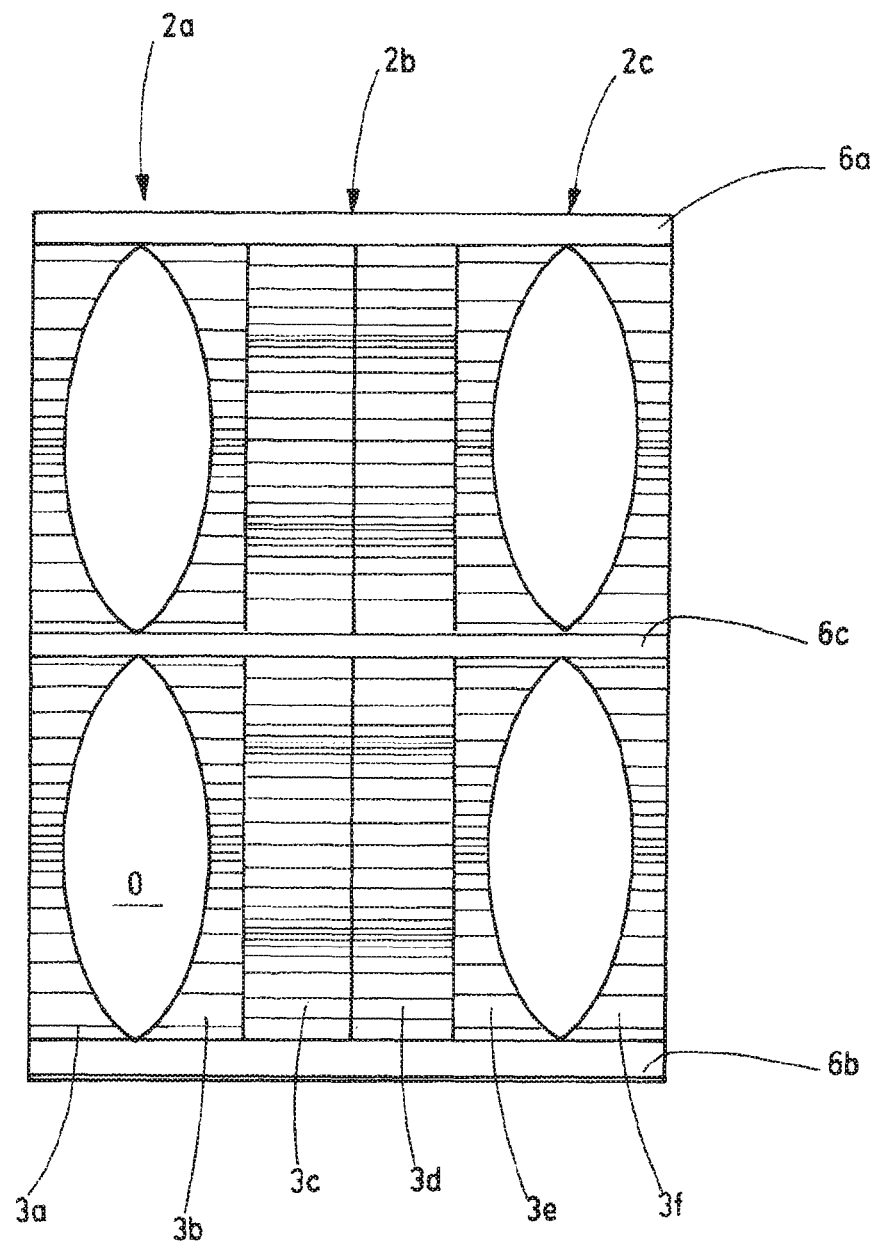
FIG. 26 is a view of the twelfth embodiment, looking in a direction corresponding to arrow IV of FIG. 2.

In FIGS. 25 and 26 a twelfth embodiment is shown, which corresponds in its basic structure to the fourth embodiment FIGS. 9 and 10, so that, again as in before mentioned embodiments, corresponding components are provided with the same reference signs and are not described further regarding their design, function and effect. The essential difference between the two before mentioned embodiments is that in the tenth embodiment the strips 3c, 3d of the second group of strips 2b are no longer torsioned, but are planar as in the known packing element. Such a measure has the advantage that hereby a simplified production of the packing element 1 is possible. Of course, it is also possible, that also for the packing elements of other embodiments one or more strips of one or more group of strips 2a-2c can be planar. The modifications to be made are apparent to the skilled person, therefore they require no further description.

In particular it is not mandatory that—as in the embodiment of FIGS. 25 and 26—the strips 3a, 3b and 3e, 3f of the outer group of strips 2a and 2c are opposingly orientated. An orientation of these strips in the same direction, for example as in the second embodiment of FIGS. 2 and 4, is possible.

The torsional stiffness of the described packing elements 1 of the afore-mentioned twelve embodiments can be further increased, if one or more strips 3a-3f have a stiffening element, in particular an appropriately formed bead. This stiffening element runs preferably in the longitudinal direction of the corresponding strips 3a-3f. Also, it can be provided that alternatively or additionally to the before mentioned stiffening elements of the strips 3a-3f at least one of the end regions 6a and 6b and preferably the central region 6c too have an appropriate stiffening element, again in particular a stiffening bead. Those run preferably in longitudinal direction of the corresponding end bridges 6a, 6b and the central region 6c, therefore preferably essentially orthogonal towards the stiffening elements of the strips 3a-3f.

By the described measures packing elements 1 are formed, wherein the described torsion of the strips 3a-3f in the respective group of strips 2a-2c causes an opening of the geometry of the packing element in all visible orientations. This is what distinguishes the described packing elements from the ones known from EP 0 764 762 B1 and leads to an increased gas permeability and therefore a decreased flow resistance of the same. Furthermore, the torsion of the strips 3a-3f causes an increased stability and therefore an increased torsional stiffness of the geometry of packing element 1.

What is claimed is:

1. A packing element, for use in mass transfer and/or heat transfer columns or towers, through which a gas and/or liquid flows, wherein the packing element confined by a first and a second outside comprises a plurality of exchange surfaces which are formed by the surfaces of wave-shaped strips having half-waves, wherein the packing element comprises at least one first group of strips, comprising at least one half-wave-shaped and/or wave-shaped strip with a first periodic length $l_1$, and at least one adjoining second group of strips, comprising at least one wave-shaped strip with a second periodic length $l_2$, wherein the wave-shaped strips extend along an imaginary axial plane of the packing element and at least one strip extends between a first end bridge and a second end bridge, the two end bridges extending in a transverse direction of the packing element, wherein the periodic length $l_1$ of a strip of the first group of strips adjoining the second group of strips, and the periodic length $l_2$ of a strip adjoining said strip of the first group of strips, are matched to each other in such a way, that the two adjoining strips are in at least one of physical and capillary contact with each other at at least one point, enabling a liquid transfer between these two strips, wherein at least one strip extends from a first end bridge to a second end bridge, and wherein the two end bridges run along the transverse direction of the packing element, wherein at least one strip of the packing element is torsioned about a torsion line running in the longitudinal direction of the packing element, wherein the torsion of the strip along said torsion line increases starting from the first end bridge, is at maximum in the area of a first amplitude maximum of the strip, decreases in the area between said amplitude maximum and the central section of the packing element, increases, starting from said central section, up to a second amplitude maximum of said strip and decreases in the area between said amplitude maximum and the second end bridge, and that all strips are in contact with each other in this central section in such a way that a persistent connection for the liquid is formed from the first outside to the second outside of the packing element.

2. The packing element according to claim 1, wherein the packing element comprises at least a third group of strips, comprising at least one half-wave-shaped and/or wave-shaped strip with a third periodic length $l_3$, that the periodic length $l_3$ of the strip of the third group of strips adjoining the second group of strips, and the periodic length $l_2$ of the strip in the second group of strips adjoining said third group of strips, are matched to each other in such a way, that the two adjoining strips are in contact with each other at at least one point, enabling a liquid transfer between these two strips.

3. The packing element according to claim 2, wherein the periodic length $l_1$ of at least one strip of the first group of strips is equal to the periodic length $l_3$ of a strip of the third group of strips.

4. The packing element according to claim 2, wherein periodic length $l_2$ or $l_1$ or $l_3$ of a group of strips is less than the periodic length $l_1$ or $l_3$ or $l_2$ of one of the other group of strips, and that preferably the periodic length $l_2$ of the second group of strips is less than the periodic length $l_1$ or $l_3$ of the first and/or third group of strips.

5. The packing element according to claim 1, wherein the torsion of the strips or at least one of the strips of the packing element occurs about a torsion line essentially coinciding with an edge of the strip.

6. The packing element according to claim 1, wherein the torsion of the strips or at least one of the strips of the packing element occurs about a torsion line essentially coinciding with a central line of the respective strip.

7. The packing element according to claim 1, wherein at least the last strip of a group of strips and the adjoining first strip of the following group of strips are formed alternatingly torsioned.

8. The packing element according to claim 1, wherein two adjoining strips of a group of strips are formed alternatingly torsioned.

9. The packing element according to claim 1, wherein the first half wave of at least one strip and the second half wave of this strip are oppositely orientated torsioned.

10. The packing element according to claim 1, wherein in at least one group of strips at least two strips are alternatingly orientated torsioned.

11. The packing element according to claim 1, wherein the last strip of a group of strips and the adjoining strip of the group of strips following the before mentioned group of strips is alternatingly orientated torsioned.

12. The packing element according to claim 1, wherein in at least one of the group of strips at least two strips are torsioned in the same direction.

13. The packing element according to claim 1, wherein the amplitude of at least one strip of at least one of the group of strips is less than the amplitude of the one or the strips of a further group of strips adjoining this group of strips.

14. The packing element according to claim 1, wherein the number of strips of a group of strips is less than the number of strips of the adjoining group of strips.

15. The packing element according to claim 1, wherein a group of strips having at least one torsioned strip is followed by a group of strips comprising at least one planar strip.

* * * * *